United States Patent [19]
Egan et al.

[11] Patent Number: 6,034,676
[45] Date of Patent: Mar. 7, 2000

[54] SYSTEM AND METHOD FOR MEASURING AND PROCESSING TIRE DEPTH DATA

[75] Inventors: Donald G. Egan, Downingtown; John Fisher, Limerick, both of Pa.

[73] Assignee: Data View, Inc., Downingtown, Pa.

[21] Appl. No.: 08/891,429

[22] Filed: Jul. 14, 1997

Related U.S. Application Data

[63] Continuation-in-part of application No. 08/420,012, Apr. 11, 1995, Pat. No. 5,657,460
[60] Provisional application No. 60/027,029, Sep. 24, 1996.

[51] Int. Cl.[7] ................................................. G06T 11/00
[52] U.S. Cl. ............................................................... 345/326
[58] Field of Search ................................. 345/326–335, 345/433–435

[56] References Cited

U.S. PATENT DOCUMENTS

| | | |
|---|---|---|
| 4,317,114 | 2/1982 | Walker . |
| 4,725,830 | 2/1988 | Kawai et al. . |
| 4,773,011 | 9/1988 | VanHoose . |
| 5,063,505 | 11/1991 | Pate et al. . |
| 5,093,907 | 3/1992 | Hwong et al. . |
| 5,134,697 | 7/1992 | Scheffler . |
| 5,255,363 | 10/1993 | Seyler . |
| 5,257,349 | 10/1993 | Alexander . |
| 5,272,769 | 12/1993 | Strnatka et al. . |
| 5,317,686 | 5/1994 | Salas et al. . |
| 5,321,800 | 6/1994 | Lesser . |
| 5,321,803 | 6/1994 | Ditter, Jr. . |
| 5,321,804 | 6/1994 | Kusaba et al. . |
| 5,353,400 | 10/1994 | Nigawara et al. . |
| 5,363,483 | 11/1994 | Jones et al. . |
| 5,365,668 | 11/1994 | Canovas et al. ................ 33/203.11 |
| 5,367,627 | 11/1994 | Johnson . |

OTHER PUBLICATIONS

"OLE Documents: Technical Backgrounder",*Microsoft Development Library,*(May 1994).
"ODBC Technical Overview", *Microsoft Tech Net CD.* 1992.
Intec Controls Corp., "Paragon Control" brochure, date unknown but prior to Jan. 27, 1993.
"In Touch"; Wonderware brochure, pp. 1–8, date unknown but prior to Jan. 27, 1993.
"WinWorX", ICONICS Product Brief, Apr. 1992, 4 sheets.
"Blind Notes", ICONICS Product Brief, Sept. 1991.
"Genesis Control Series", ICONICS, pp. 2–25, date unknown but prior to Jan. 27, 1993.
The Fix, The Fully Integrated Control System from Intellution, M&D Controls Co., 9 N. Bacton Hill Road, Frazer, PA 19355, pp. 1–22, date unknown but prior to Jan. 27, 1993.
Mcintosh Operating System "drag and drop"feature, commercially available prior to Apr. 11, 1994.
Fowler, "Precision Tools and Instruments Catalog 2196", Anniversary Edition 1946–1996, pp. 138–140.

*Primary Examiner*—Almis R. Jankus
*Attorney, Agent, or Firm*—Ratner & Prestia

[57] ABSTRACT

A system and method for collecting and processing tire tread depth data from a plurality of tires is provided. A sensor measures the tread depth of one of the tires and produces a tread depth signal representing the tire tread depth. The tread depth signal is transmitted over a communications medium from the sensor to the serial port of a computer. The computer includes a database or spread sheet for storing an entry associating a respective tire tread depth with each tire. The computer displays a graphic representing each of the tires. The graphic includes a representation of the bottom of a truck on which the tires are installed. The graphic has a respective region representing each of the tires. A region of the graphic is selected. The selected region of the graphic is linked to a corresponding one of the plurality of data representing tire tread depth in the database or spreadsheet. When the tread depth signal is transmitted over the communications medium, the computer changes the corresponding one of the plurality of data in the database or spreadsheet, in response to the tread depth signal. The color of each region is varied, based on the respective tread depth stored in the database or spreadsheet for each respective tire.

21 Claims, 21 Drawing Sheets

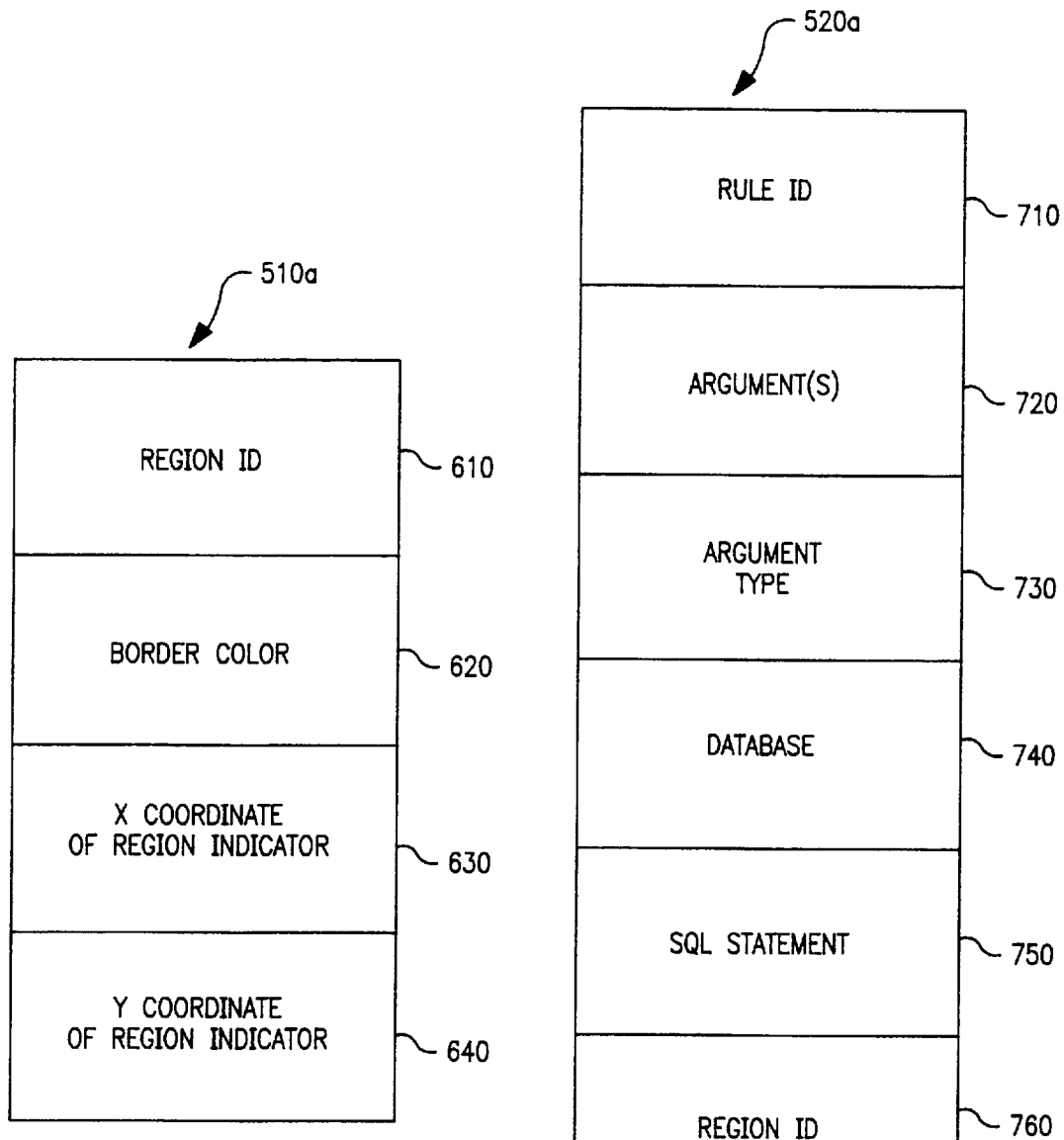

SYSTEM AND METHOD FOR MEASURING AND PROCESSING TIRE DEPTH DATA

This is a continuation in part application of application Ser. No. 08/420,012 filed Apr. 11, 1995 now U.S. Pat. No. 5,657,460. This application claims priority from U.S. Provisional Application No. 60/027,029 filed Sept. 24, 1996.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The increasing complexity of the marketplace has made it increasingly important for business persons to assimilate large volumes of information efficiently. Business and industry are increasingly challenged to quickly and efficiently administer, record, account for and analyze the changing attributes of those things that they produce, service, maintain, market, sell and administer. Typically, the most effective method of presenting data is graphically, using pictures and charts.

Statistical analysis software programs that receive sets of input data and output histograms, pie charts and line graphs are well known. There are many business decisions for which these presentation methods do not provide the information in a form that is quickly and easily understood by the business person.

Powerful microprocessors have made user-friendly Man-Machine Interfaces (MMIs) practical. Fourth generation programming tools have been developed to facilitate the development and maintenance of MMI software.

The InTouch™ software development toolkit by the Wonderware Corporation of Irvine, Calif., is an MMI application generator for supervisory control, monitoring and data acquisition applications in an MS Windows environment.

InTouch™ provides the capability to develop graphics which are embedded within the MMI application as "smart objects." The objects may be connected to desired data values in a spreadsheet. "Action scripts" may be invoked for "change of state" conditions, upon opening of windows, or occurrence of an alarm condition. Alarms may be assigned, causing a portion of the display to change color. In Touch uses a proprietary extension of the Dynamic Data Exchange data transfer mechanism to connect spreadsheets or databases to the MMI applications.

Application software developers require additional tools for quickly and easily developing portable MMI application programs. In particular, tools are required for displaying each type of data in the format that is most easily understood. These tools must be simple enough for the developers to master quickly, but capable of producing graphical output displays having a virtually unlimited variety of formats.

The end users of these applications require the data in a format that they can readily understand. For example, the operators of trucking fleets must collect and track large quantities of information about tires. Tire expenses are typically among the highest costs for a trucking fleet. Tire wear and age must be tracked. The number of times that an individual tire has been retread must be tracked. Repairs for each truck in the fleet that may influence tire wear should be tracked. Special repairs performed on an individual tire must be tracked. The fleet operator should be able to compare the cost effectiveness of products made by different tire manufacturers, and of different brands made by a single manufacture. For each tire, the fleet operator should be able to predict an expected time for retreading or replacing the tire, both to schedule maintenance operations and to budget for the repair and replacement expenses. The inventors are not aware of any automated system in the prior art meeting the needs of truck fleet operators.

Fleet operators need automated tools for inspecting and managing their tires. Software developers need a development toolkit that facilitates the development of such a system.

SUMMARY OF THE INVENTION

The present invention is a system and method for measuring and processing tire tread depth data. A sensor measures a tread depth of a tire and produces a tread depth signal representing the tire tread depth. A communications mechanism is coupled to the sensor for receiving the tread depth signal and transmitting the tread depth signal to a computer. The computer includes a database or spreadsheet for receiving the tread depth signal and for storing an entry associating the tire tread depth with the tire.

BRIEF DESCRIPTION OF THE FIGURES

FIG. 6 is a block diagram of a region data structure shown in FIG. 5.

FIG. 7 is a block diagram of a rule data structure shown in FIG. 5.

FIGS. 10–15 show displays containing dialog boxes, as generated by the system of FIG. 1.

FIGS. 17–20 show displays containing dialog boxes, as generated by the system of FIG. 1.

INTRODUCTION

Figure 1:
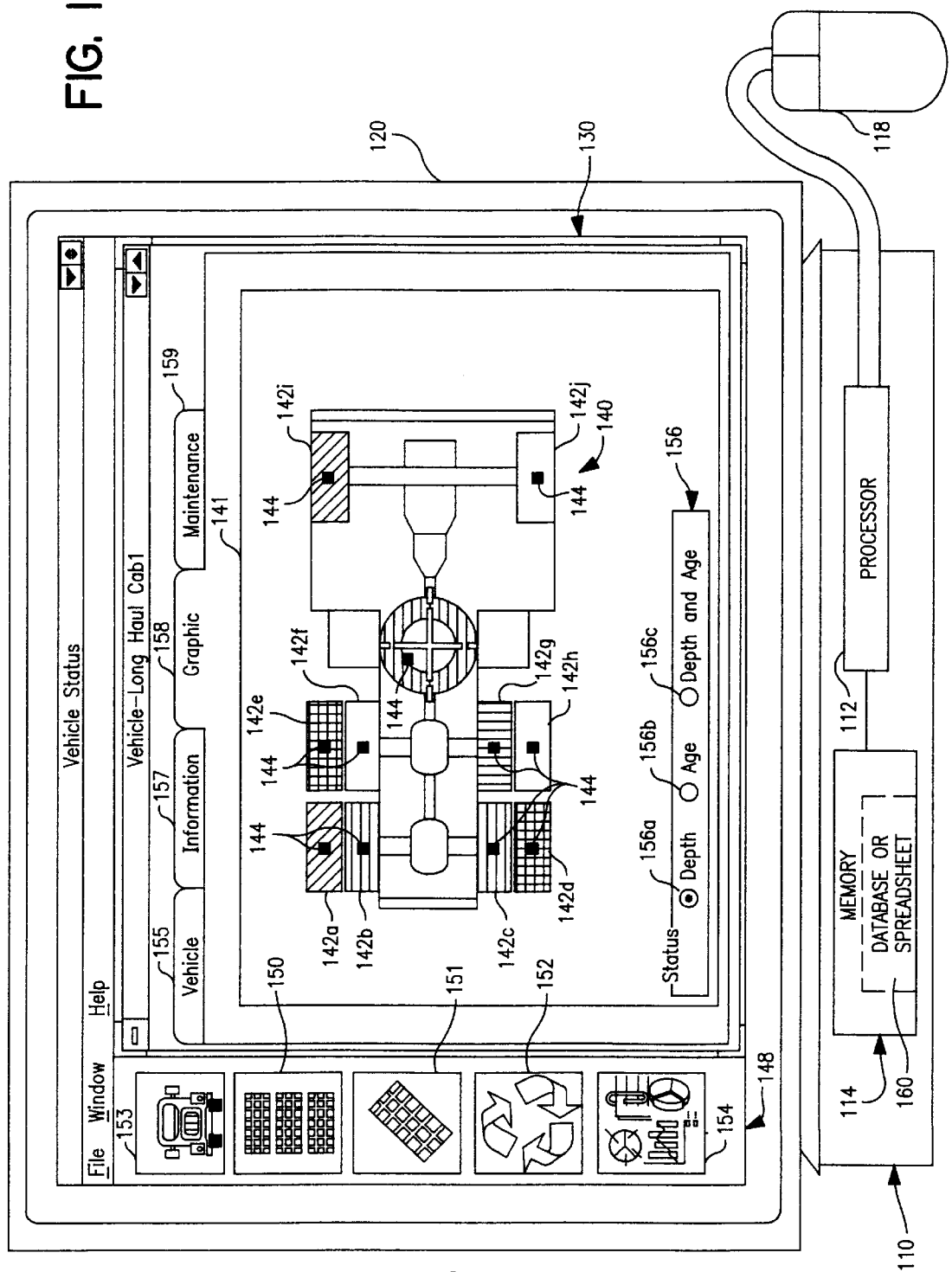
FIG. 1 is a diagram of an exemplary computer system suitable for practicing the invention.

The complexity of measuring and collecting critical attributes of tires has made it important to develop an efficient tire data collection and processing system. The transportation fleets, and those involved in tire inspection and compliance need a method that facilitates the capture, and processing of tire tread depth.

The inventors have discovered that the most effective way to obtain the tread depth of a tire involves capturing the data with a hand held component that recognizes, transmits, processes and visually represents the attributes of the tires.

Those who are responsible for the inspection, maintenance, repair and analysis of tires need an effective and efficient way to obtain, process and visually represent the important attributes of a tire, such as tread depth. A hand held depth gage is an efficient tool for collecting, capturing and outputting the tread depth of a tire. Preferably, the hand held device that captures the tread depth of a tire is easy to use and capable of transmitting tread depth data to a database or spreadsheet so that an analysis may be performed. Preferably, the analysis results and representation of the tread depth are shown as a visual output display using color and graphics.

The present invention allows a tire inspector involved in the manufacturing of tread rubber/tires and recap treads to ensure that, as a tire is produced, repaired, or retreaded, compliance with manufacturing specifications including tread depth is maintained. The invention allows quality assurance inspectors to ensure adherence to standards and specifications. Tire inspectors who examine tires during the tire's life cycle (including time in inventory, time on a vehicle, time in repair, and at time of disposal) can quickly obtain the tread depth of a tire. The tread depth of a tire may be obtained multiple times during the lifecycle of the tire. The invention allows the tire inspector to not only capture the tire tread depth, but also to automatically record and analyze the data. In addition, the invention allows the user to process the data to determine compliance with established governmental legal tire depth limits, specific wheel position parameters, and contractual and warrantee specifications/requirements.

The most effective and accurate way to measure a tire tread depth is to capture the data using an automatic data capture device-depth gage reader. The depth gage reader reduces data capture errors and saves time. This should prove to provide a cost and time saving and ensure accuracy of data. Also, this improves overall tire management and results in better compliance with tire regulations and better safety practices.

Detailed Description

The present invention is described in three main sections.
1. Section I describes a software application development tool that may be used to develop the exemplary tire data acquisition and processing system.
2. Section II describes a tire data management software application developed using the tool described in section I (referred to herein as the VEHICLE STATUS APPLICATION PROGRAM).
3. Section III describes the complete tire depth data acquisition and processing system, including a computer executing the program described in section II.

I. Software Application Development Tool

The present invention is a system and method for creating a relationship between a plurality of data and a graphic representing the data (which may be stored as a bitmap). When data are stored in a database, file, spreadsheet, or other format, the invention determines the graphic's appearance so as to reflect the values of the data. The invention allows software application developers and end-users to quickly add visual attributes (e.g., coloring or shading) to a graphic.

The invention is embodied in a tool for software developers, and in application programs that use the tool. The tool identifies regions within a bitmap, as well and colors in these regions. The color depends on the data in the spreadsheet or database.

FIG. 1 is a block diagram of an exemplary computer system 100 suitable for practicing the invention. The computer system 100 comprises a computer 110 having a processor 112, memory (typically including both Random Access Memory (RAM) and at least one disk drive). A database or spreadsheet 160 is stored in the memory 114. The computer system 100 also includes a display 120, and a pointing device 118, which may be a mouse (other pointing devices, such as a trackball, stylus, light pen, puck or touch screen may also be used).

Figure 2:
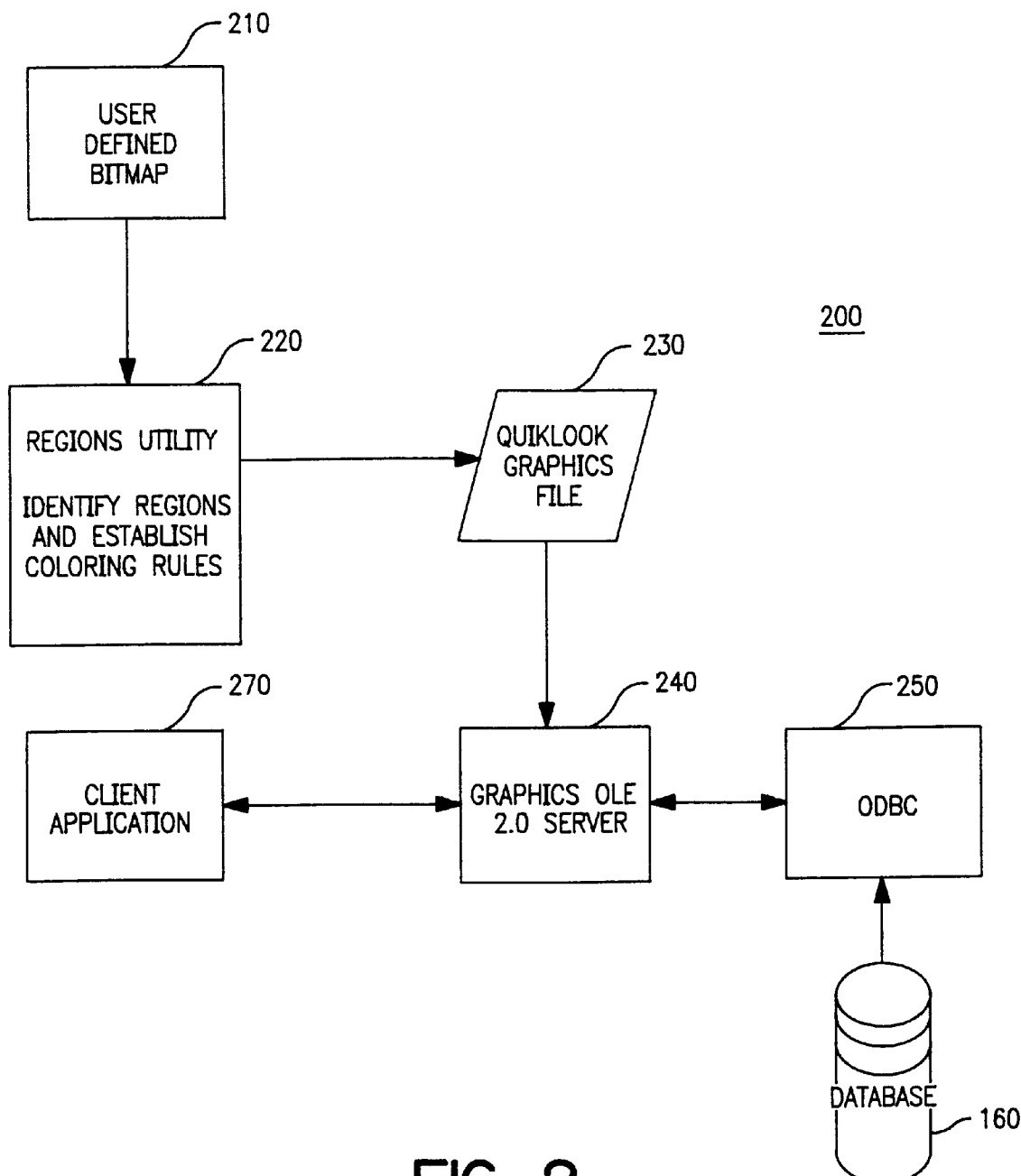
FIG. 2 is a block diagram of a software system for practicing the invention in the computer system of FIG. 1.

FIG. 2 is a block diagram of an exemplary system 200 in accordance with the invention. The invention is a system and method for managing a plurality of data values which define an attribute of an object.

A facility 210 is provided for defining an arbitrary, user defined graphic 140 (shown in FIG. 1) that is displayed by the computer 100. The graphic 140 is stored in the form of a bitmap. This bitmap may be created with any painting or drawing application that supports bitmap (BMP) file format. Several commercially available painting software applications support this file format: e.g., "PAINTBRUSH"™ (by the MicroSoft Corporation) and "COREL DRAW"™ (by the Corel Corporation of Ottawa, Ontario, Canada) support this file format. System 200 uses a user defined bitmap from the graphic facility 210 as a starting point. In the exemplary embodiment shown in FIG. 1, the graphic 140 is a bottom view of a truck.

Throughout the description, the bitmap (BMP) file format is referenced because it is the most popular graphic file format for the Windows 3.x environment. However, the invention may also be practiced using other graphic file formats, such as Tag Image File Format (TIFF), Compuserve graphics image format (GIF), PCPaintbrush (PCX) and others.

A region utility 220 is provided for identifying a plurality of regions 142a–142j within the graphic 140. A region is any area within the bitmap that is completely enclosed by a border. The regions 142a–142j have a visual attribute, which has a value. The regions utility 220 is used to identify portions of the graphic, the visual attributes of which are determined automatically by software. In the embodiment of FIG. 1, the regions 142a–142j are representations of tires, and the visual attribute is color. Although reference is made hereinafter to determination of the color of a region, it will be understood that other visual attributes (e.g., shade, cross hatching or apparent depth) could be defined in the same manner.

The region utility 220 is used by the software developer of the system shown in FIG. 1 to enter two type of data: (1) region data which define the locations of the regions 142a–142j within the bitmap 140; and (2) rule data, which define the database or spreadsheet 160 in which the object attributes are stored, and the criteria by which the visual attributes of the region are determined from the information in the database or spreadsheet 160.

Figure 5:
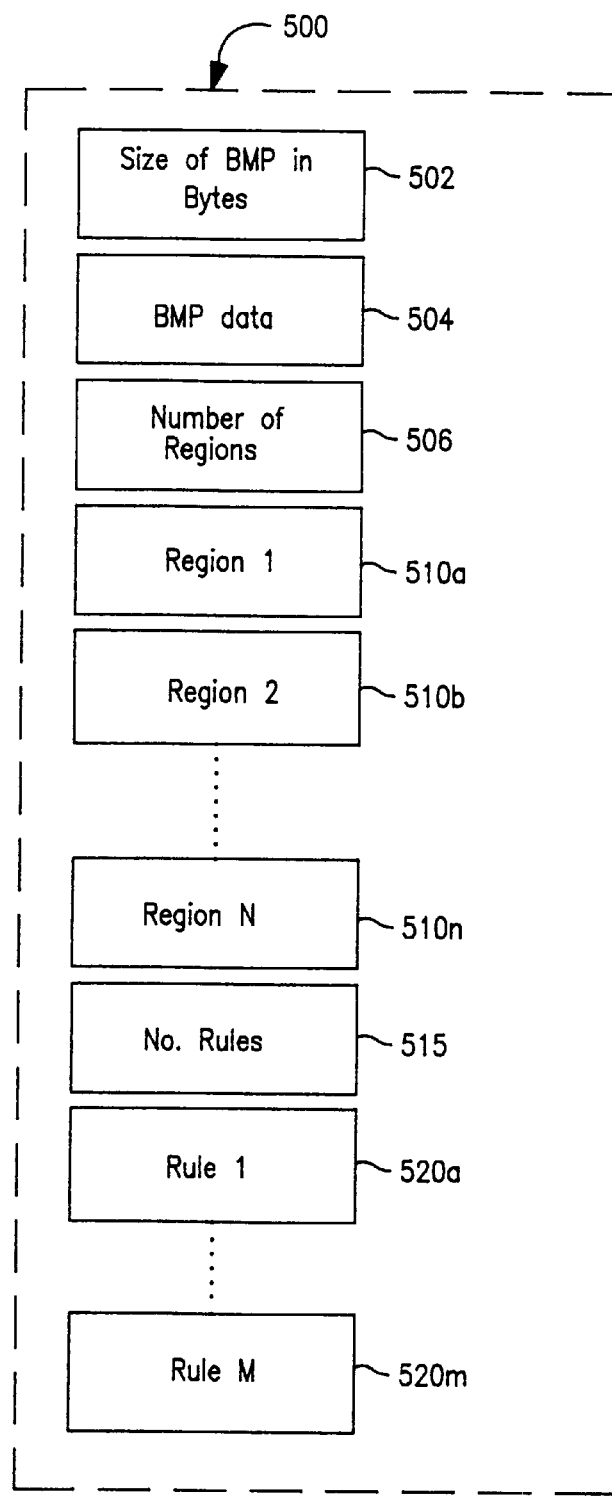
FIG. 5 is a block diagram of a file structure created by the method of FIG. 3.

The region utility 220 creates a graphics file structure 500 (shown in FIG. 5). When the user saves region and rule information created during a session with the region utility 220, the data are stored in a QuikLook Graphics file 230 (hereafter QLG file 230) using a format referred to as the QuikLook Graphics file format (hereafter, QLG file format). The QLG file format defines a single file structure which contains: (1) a bitmapped representation of the graphic; (2) a plurality of region data structures; and (3) a plurality of rule data structures. The region utility 220 has the ability to write and read files which are formatted according to the QLG file format. The format is described in detail below with reference to FIGS. 6 and 7.

A graphics server 240 is provided for linking the identified regions 142*a*–142*j* of the graphic 140 to respective data fields of the DBMS or spreadsheet 160. The graphic server 240 applies the rules stored in the QLG file 230 to determine the values of the visual attribute of each region 142*a*–142*j* as a function of the respective data values stored in the database or spreadsheet 160.

The graphics server 240 is used by a client application program 270 at run time to identify the value of the visual attribute of each region 142*a*–142*j* in the graphic 140, and to set the appearance of the regions. For example, in the embodiment shown in FIG. 1, the client application program 270 manages truck tire information. The client application 270 displays the graphic 140 as part of an application display screen 130. The client application program 270 calls the graphics server 240, which identifies the colors for each of the regions 142*a*–142*j* (representing tires), and paints each region an appropriate color.

According to another aspect of the invention, the client application 270 can use the graphics server 240 for modifying the identified regions of the graphic 140 interactively. The user of the client application program 270 uses a pointing device, such as a mouse 118 (shown in FIG. 1), to select one of the regions 142*a*–142*j*. The selected region of the graphic 140 is then dragged to a predetermined field 150, 151 or 152 within the display 130, and dropped in the predetermined field. Responsive to the drag and drop events, a corresponding value stored in the database 160 is modified.

For example, in the exemplary application program, a dialog box is displayed, into which a user inputs data describing a change in status of the object represented by the region that has been dropped. A message is automatically transmitted to the database, identifying the change in status.

The invention provides a component-based software application that may be utilized by many different types of computer users, from end-users of commercial off-the-shelf DBMSs and spreadsheet programs to software application developers. Developers can easily use a toolkit in accordance with the invention in their application development efforts. End-users can easily use the invention to display spreadsheet data in a more easy-to-understand format.

The end-user of an application program according to the invention can gain an understanding of the objects in the database while viewing the attributes which change with the passage of time, change in status, or other variable. In addition, the graphic representing the objects is automatically updated as the underlying variable (time, status, etc.) changes.

Figure 3:
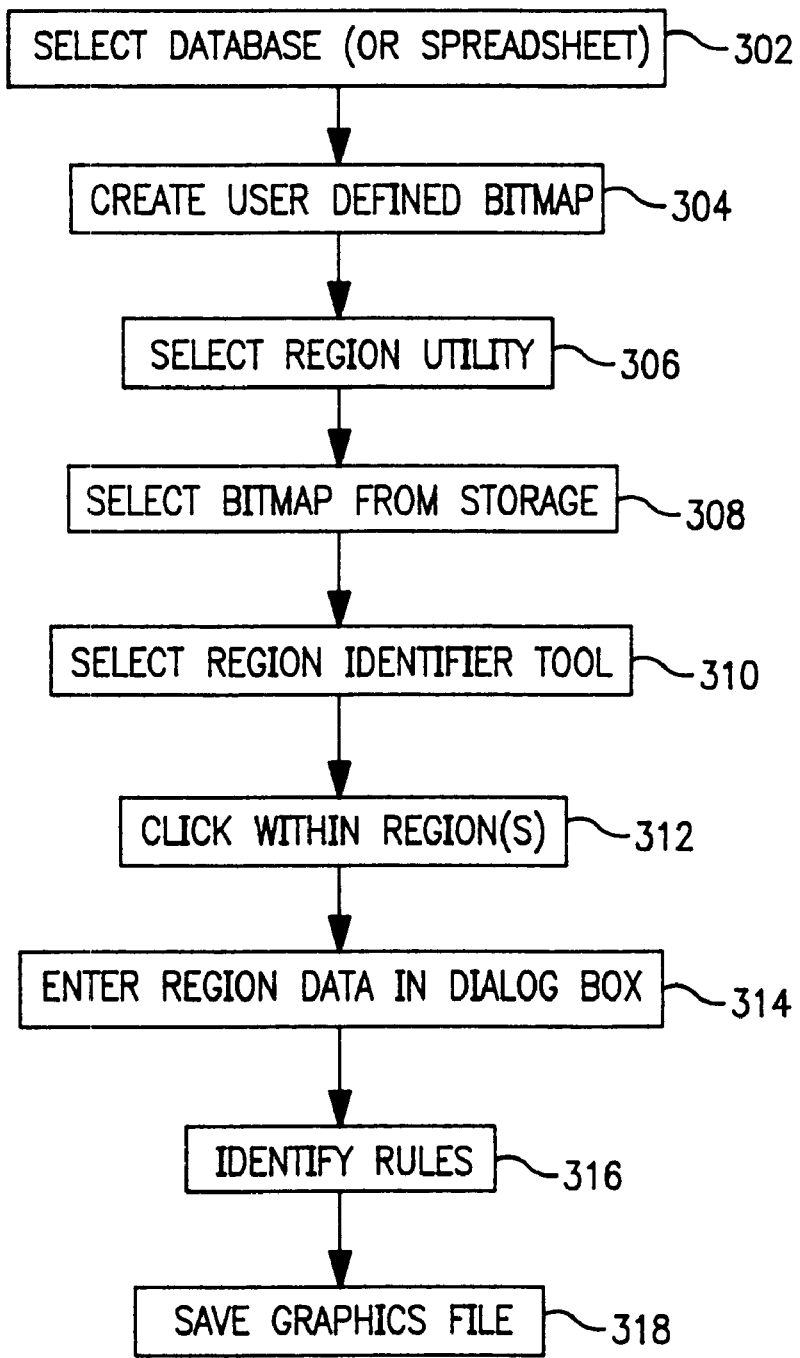
FIG. 3 is a flow chart diagram of an exemplary process for entering the information defining the graphic shown in FIG. 1 into the system shown in FIG. 2.
Figure 4A:
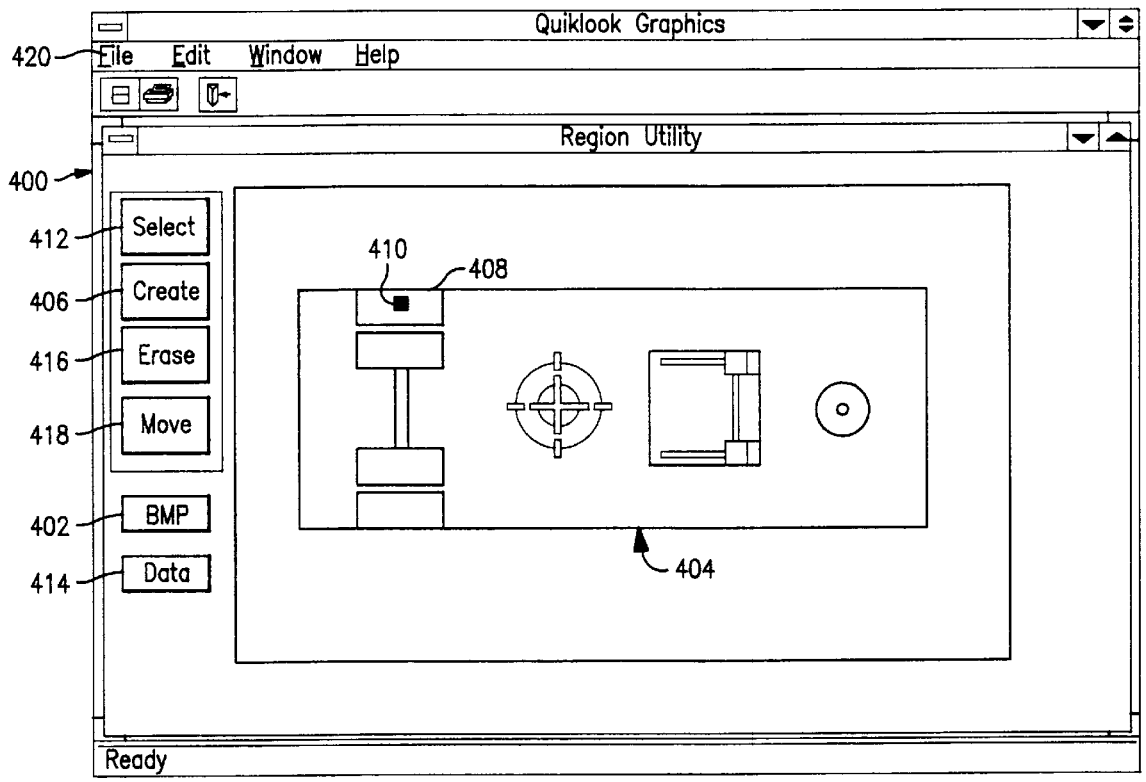
FIGS. 4A–4C show dialog boxes used for entering the information into the computer shown in FIG. 1, using the method shown in FIG. 3.
Figure 4B:
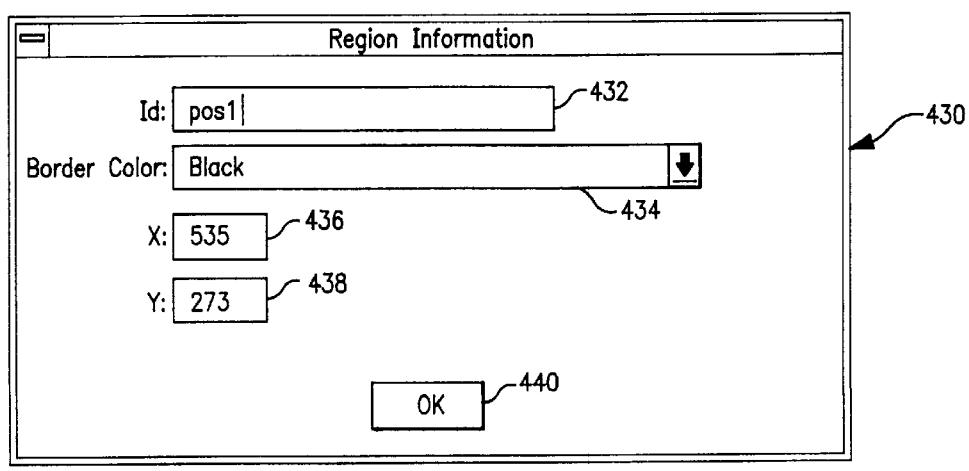
Figure 4C:
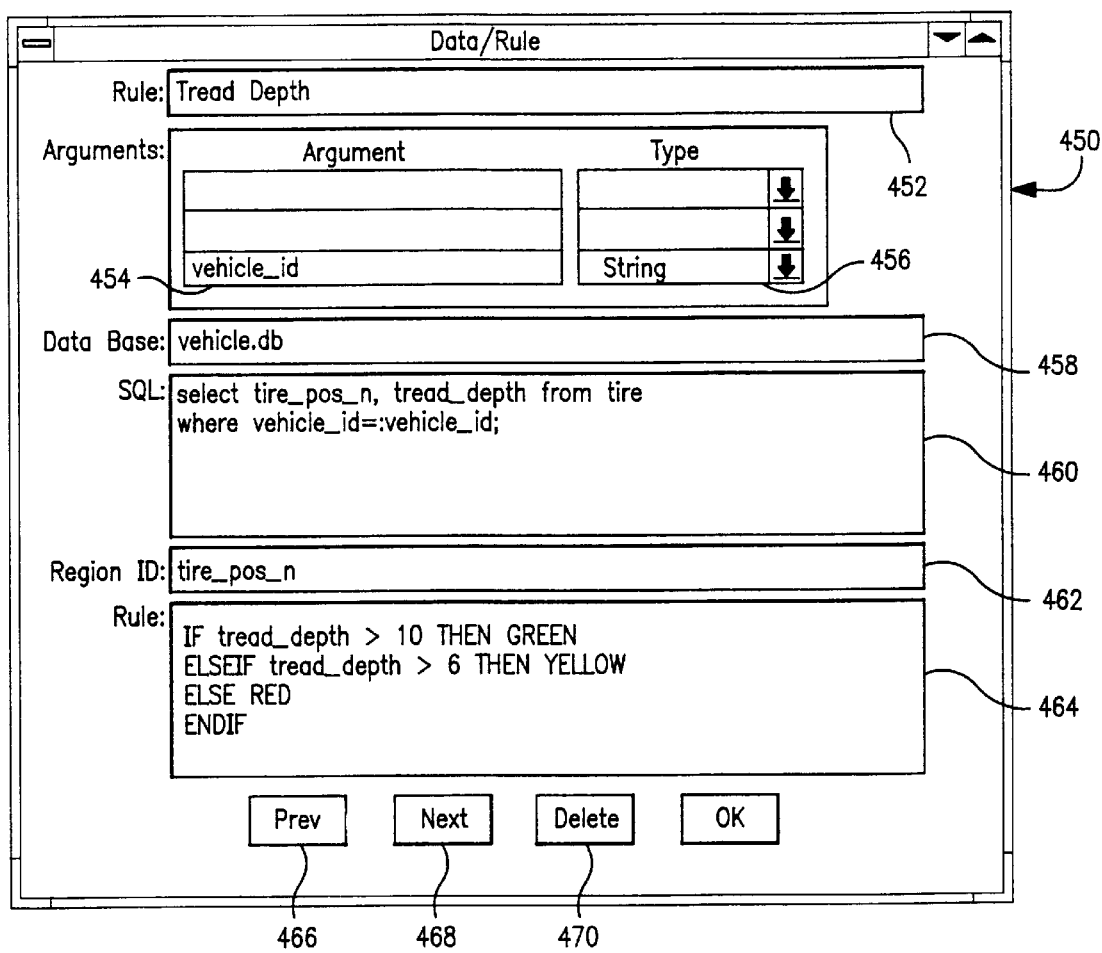

FIG. 3 is a flow chart diagram of an exemplary method for developing an application using a development tool according to the invention. FIGS. 4A–4C are exemplary screens displayed by the tool during development.

In FIG. 3, at step 302, the developer determines what database or spreadsheet to use. In the exemplary embodiment, a database is used. If a database is used, it is preferable to use a database management system (DBMS) for which an Open Database Connectivity (ODBC) driver has been developed. The ODBC interface is specified in "ODBC Technical Overview", Microsoft Technet CD, 1992, which is expressly incorporated by reference herein for its teachings on an interface for portable database application development.

At step 304, the developer creates the graphic in the form of a bitmap.

At step 306, the developer initiates the region identifier utility 220 (shown in FIG. 2). This action causes the region utility window 400 (shown in FIG. 4A) to be displayed.

At step 308, the developer selects the BMP button 402 (FIG. 4A) with the pointing device 118. A file selection dialog box (not shown) displays all of the bitmap files in the current directory, from which the bitmap is selected from storage. The graphic 404 is displayed. In FIG. 4A, the graphic 404 is a bottom view of a truck trailer.

At step 310 (FIG. 3), the developer initiates the region identifier tool by selecting the "Create" button 406 (FIG. 4A). The system is now prepared for identification of regions.

At step 312 (FIG. 3), the developer selects a region 408 (FIG. 4A) by clicking the mouse within the region 408. A small region indicator 410 (which may be a square box) is displayed within the selected region 408. The developer continues selecting regions as desired.

At step 314 (FIG. 3), the developer clicks on the "Select" button 412 (FIG. 4A). Hereafter, the terms "select" and "click on" are used interchangeably. (One of ordinary skill in the art will recognize that, although the term "click" best describes selection using a mouse, selection via other pointing devices is also contemplated within the scope of the invention). The developer then clicks on one of the region indicators 410.

FIG. 4B shows the region indicator dialog box 430 that is displayed when the "Select" button 412 is selected in step 314 (FIG. 3). The dialog box 430 includes a region identifier (ID) 432, an indication of the color of the border of the region, and a plurality of position coordinates 436 and 438 defining a location of a point in the region. In the exemplary embodiment, the plurality of position coordinates define the location of the upper left corner of the region indicator 410 relative to a corner of the bitmap 404. The X and Y coordinates 436 and 438 are displayed, and may be edited by the developer. The developer also enters the region ID 432 and the border color 434, and selects the "OK" button 440. The developer continues to select region indicators until data have been entered for each region.

At step 316 (FIG. 3), when all of the region data are created, the developer may select the "Data" button 414 (FIG. 4A) to enter rule data.

FIG. 4C shows the rule data dialog box 450 hat is displayed in step 316. Each graphic 404 may be associated with one or more rules. A rule may be used to define the colors of all of the identified regions 408 in the graphic 404.

A rule identifier (ID) is entered in the rule field 452. The name of the variable in the database query is entered in the argument field 454. The "type" of the variable in argument field 454 is entered in the "argument type" field 456. One or more arguments may be entered. The name of the database in which the data that define the objects are stored is entered. The database query (which may be written in Structured Query Language, SQL) is entered in the SQL field 460. Each region of the graphic corresponds to a respective entry in the region ID column of a table in the database. In field 458, the name of the variable in the SQL statement 460 (and in the database) that corresponds to the region ID (FIG. 4B) is entered in Region ID field 462. The rule that is used to determine the color of a region 408 based on the results of the query is entered in rule field 464.

A given application program may include one or more rules for a particular graphic. Only one of the rules is applied at any given time to color the regions. For example, in FIG. 1, the status box 156 allows the end user of the application to select one of the following three criteria: (1) "depth" 156a, (2) "age" 156b or (3) "depth and age" 156c. The application is programmed so that selecting any of these three criteria 156a–156c results in the use of a respectively different rule. For example, when "depth" 156a is selected (as shown), then the rule "Tread Depth" shown in FIG. 4C is used.

The Data/Rule dialog box 450 allows the developer to specify many rules. To move through rules already stored for a particular bitmap, the developer selects the "PREV" button 466 (to move to a previous data/rule) or the "NEXT" button 468 (to move to the next rule). To delete a rule, the developer selects the "DELETE" button 470. To add a new rule the developer selects the "PREV" button 466 or the "NEXT" button 468 until a blank form 450 is reached.

The specific rule information shown in FIG. 4C is described below with reference to an exemplary application program in accordance with the invention. This program is a system for managing truck tire data.

FIG. 4A shows additional controls that may be used to modify region data that have already been created. An "erase" button 416 is selected to erase (remove) a region indicator 410 hat has already been created. When a region is "erased", it is no longer colored according to the rule at run time.

A "move" button 418 allows the developer to move a region indicator 410 to a new location, so that a different portion of the graphic is colored in accordance with the rule. Also, the "move" button 418 may be used to adjust the position of the region indicator within the region in which it is currently placed.

At step 318 (FIG. 3), when the "Save" command is selected from the "File" menu 420, the region and rule data created in steps 312–316 are saved in a Quicklook Graphics (QLG) file structure 500 (shown in FIG. 5). This file is used by the Graphics OLE server 240 (shown in FIG. 2).

Using the "Open" command from the "File" menu 420 (FIG. 4), the developer can open an existing QLG file 500 (shown in FIG. 5) that was created during an earlier session with the region utility 220. The region utility 220 retrieves all information stored in the file 500. The developer can then modify and manipulate the identified regions and save the changes.

QLG File Structure

FIG. 5 is a block diagram of a QLG file 500. The file structure 500 includes all the information needed to define the graphic to an application program. A bitmap size field 502 specifies the size of the bitmap of the graphic. The bitmap data are stored in a field 504. The number of regions defined in steps 312 and 314 (FIG. 3) are specified in a field 506. The region data for each region are stored, individually, in region data structures 510a–510n. After the last region 510n, the number of rules appears in a field 515. A rule data structure 520a–520m is provided for each rule used to color the graphic 404. If more than one rule is entered for a graphic, there is a respective rule data structure for each rule 520a–520m.

FIG. 6 is a block diagram of one of the region data structures 510a shown in FIG. 5. The other region data structures 510b–510n have the same components as the data structure 510a, and are not described separately herein. Data structure 510a (FIG. 6) includes a region ID field 610 for storing the region ID entered in field 432 (FIG. 4B) of the region dialog box 430. A border color field 620 (FIG. 6) stores the border color entered in field 434 (FIG. 4B). An X coordinate field 630 stores the X coordinate entered in field 436 (FIG. 4B). A Y coordinate field 640 stores the Y coordinate entered in field 438 (FIG. 4B).

The Region data structure 510a may be defined using the following statements:

```
#define MAXREGIONS 1000
struct stRegion{
        char * id;      //string to identify the region - ID in the region
information dialog box
        long bordercolor; //border color of the region
        long xpos; //x position of region identifier
        long ypos; //y position of region identifier
} tyRegion;
tyRegion aRegion[1:MAXREGIONS]; //an array of regions
```

Each time a region is identified by the developer, an entry into a region data structure 510a is made. The descriptor aRegion indicates an array of regions. An example of an entry in aRegion is:

```
aRegion[1].id = "pos1"
aRegion[1].border color = 255
aRegion[1].xpos = 535
aRegion[1].ypos = 273
```

The entries in this data structure are maintained and manipulated by the user through the toolbar actions of Select, Create, Erase, and Move.

FIG. 7 is a block diagram of the rule data structure 520a shown in FIG. 5. Data structure 520a (FIG. 7) includes a rule ID field 710 for storing the rule ID entered in the rule ID field 452 of the rule dialog box 450 (shown in FIG. 4C). An argument field 720 stores the name of one or more arguments (entered in field 454 of FIG. 4C) that are used to query the database. An argument type field 730 (FIG. 7) stores the type of the argument stored in field 720 (entered in field 456 of dialog box 450). A database field 740 stores the name of the database entered in the database field 458 of dialog box 450 (FIG. 4C). The SQL field 750 (FIG. 7) stores the database query entered in field 460 of dialog box 450 (FIG. 4C). The regionid field 760 (FIG. 7) stores the name of the region ID variable used in the SQL statement in field 460 of dialog box 450 (FIG. 4C). The rule field 770 (FIG. 7) stores the rule entered in the rule field 464 of dialog box 450 (FIG. 4C). The rule may be written in the same language as the application program. For example, in the exemplary embodiment, the rule is written in PowerBuilder Power-Script syntax.

The rules are stored in the following data structure.

```
#DEFINE MAXRULES 100
struct stRule {
        char * ruleid; //string identifing the rule name
        char * argument; //coma delimited string identifing
                arguments ie arg1;arg2;arg3;
        char *argumenttype; //coma delimited string
```

-continued

```
        identifying argument types
        number;string;number;
    char * database; //string identifing the database
    char * sql; //the sql statement
    char * regionid; //column to use as region
            identifier
        char * rule: //the rule
} tyRule
tyRule aRule[1:MAXRULES]; //array of rules
```

Graphics Server Software Architecture

The exemplary software development toolkit according to the invention uses Object Linking and Embedding (OLE) 2.0 technology as described in *OLE Custom Controls Backgrounder* (C) 1992–1995 MicroSoft Corporation, which is expressly incorporated by reference herein for its teachings on developing embedded controls. The exemplary system is implemented as an OLE 2.0 custom control.

The exemplary software system 200 (FIG. 2) was developed using MicroSoft Visual C++ and compiled as an OLE 2.0 capable application. The system may be used in any environment supporting OLE 2.0 custom controls and applications.

Although the exemplary embodiment uses OLE Custom Controls, as described below, other equivalent container type methods, such as ActiveX, may be used within the scope of the invention.

An OLE Custom Control is an embeddable object with in-place activation capabilities. To be "embeddable" means that a control is capable of being placed inside another application. "In-place activation" means that the application inside of which the control is placed can modify or use the control.

A custom control has three sets of attributes: properties, events, and methods, as defined in *OLE Custom Controls Backgrounder*. Properties are named characteristics or values of the control such as color, text, number, or font. Events are actions triggered by the control in response to some external action on the control, such as clicking a mouse button. Methods allow external code to manipulate the object's appearance, behavior, or properties.

Events supported by the graphics server 240 include RegionClick, RegionDoubleCLick, RegionDrag, and RegionDrop.

Events are used by MicroSoft Windows objects to detect that something (i.e., mouse click, mouse move) has happened. An application program may respond to these events. For example, the OLE 2.0 graphics server 240 (FIG. 2) may send information back by setting the event message parameters. Events, event messages, Click, Double Click, Drag, and Drop are part of the technology of Windows. The following events are supported by the graphics server 240 (FIG. 2).

When the mouse button is clicked on a region identifier, the graphics OLE 2.0 server 240 responds with a Region-Click event. The message string parameter of the message sent by the graphics server 240 is set to the string 432 (FIG. 4A) identifying the region 408.

When the mouse button is double-clicked on a region identifier 410, the graphic OLE 2.0 server responds with a RegionDoubleClick event. The message string parameter of the message sent by the graphics server 240 is set to the string 432 (FIG. 4A) identifying the region 408.

The dragging of a region 408 starts a RegionDrag event and sets the message string parameter of the message sent by the graphics server 240 to the string 432 identifying the region 408.

A RegionDrop event identifies that a software object has been dropped on a region (e.g., retread region 151 in FIG. 1). The message string parameter of the message sent by the graphics server 240 is set to the string identifying the region 151.

Methods supported by the graphics server 240 include QLGraphicFile, QLShowRegions, QLRegions, QLAddRegion, QLDeleteRegion, QLRegionColor, QLPaintRegion and QLDataSource. Each method returns the value logic TRUE if successful; otherwise the method returns the value logic FALSE.

Figure 8:
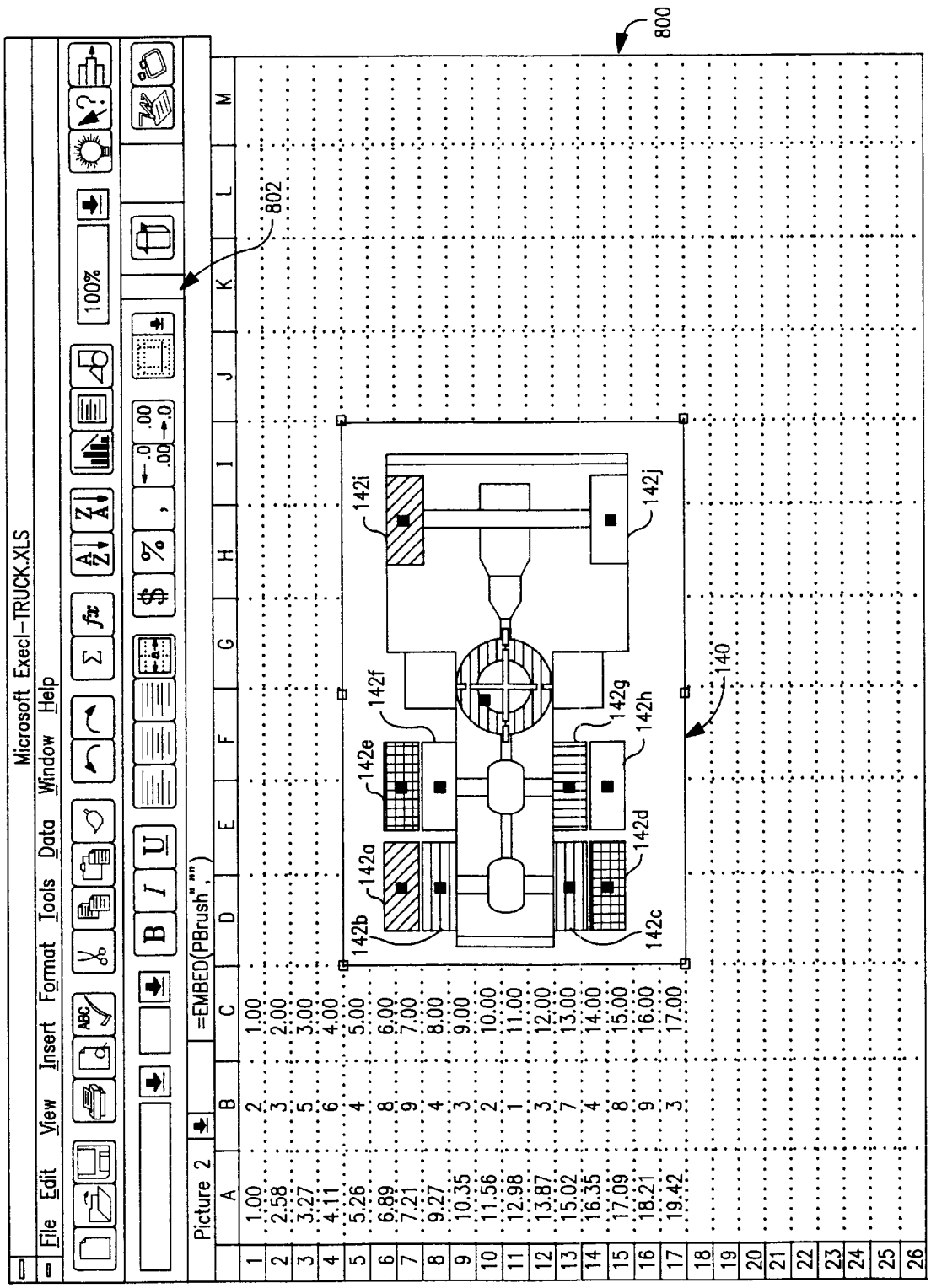
FIG. 8 shows a second exemplary embodiment of the invention implemented as a spreadsheet with region color defined by program control.

The QLGraphicFile method accepts a string identifying the QLG file 500 (FIG. 5) as a parameter. The QLGraphic-File method displays the bitmap portion 504 of the QLG file 500 in a picture container 141 (FIG. 1). This creates a view of the graphic 140 within an application program window 130, as shown in FIG. 1 or FIG. 8.

The QLShowRegions method accepts a Boolean as a parameter. When the value of the Boolean parameter is logic TRUE, the system 100 (FIG. 1) displays all the region identifiers 144. When the Boolean parameter is FALSE the system 100 removes the region identifiers 144 from view. This allows the programmer to determine whether the region identifiers are displayed to the end-user.

The QLRegions method accepts the nRegions value (in field 506 of QLG file 500, FIG. 5) and the aRegion structure 510a–510n as a parameter. The QLRegions method returns the number of regions defined in the current QLG file 500 in the nRegions field 506 and the region information in the aRegion structures 510a–510n to the application program 270. This allows the application program 270 to use the region information for any of the application's computations.

The QLAddRegion method gives the developer the ability to add regions at run-time. QLAddRegion accepts a tyRegion parameter (described above with reference to FIG. 6) and adds this new region to the internal aRegion structure 510a–510n.

The QLDeleteRegion method gives the developer the ability to delete regions at run-time. QLDeleteRegion accepts a string parameter identifying the region and removes this identified region from the internal aRegion structure 510a–510n. Thus, QLAddRegion and QLDeleteRegion allow the developer to use conditions determined at run-time to dynamically select a subset of the plurality of regions for which the value of the visual attribute is determined using the rule (i.e., to dynamically select which parts of the graphic 140 are colored).

QLRegionColor returns the current color of a region. QLRegionColor accepts a string parameter identifying the region for which the color is provided.

QLPaintRegion paints a region a specified color. QLPaintRegion accepts a string parameter identifying the region which is to be painted and a color parameter indicating the color to be used. To paint a region, the QLPaintRegion method uses a Microsoft Windows 3.X application program interface (API) call to the FloodFill( ) function.

The QLDataSource( ) method uses the database, SQL statement, and rules identified by the Region Utility in the dialog boxes of FIGS. 4A–4C. This method attaches to the database 160 (FIG. 2) and runs the SQL statement through ODBC. ODBC retrieves the data from the database and sends back the results to the QLDataSource method. QLDataSource loops through the results set and, for each regionid, applies the region's rule to the region's data to determine a color, then calls QLPaintRegion to color the region the determined color.

To specify a rule to use, the application program passes the rule name and any arguments to QLDataSource( ).

In the example of calling the rule entered in FIG. 4C, the application program calls QLDataSource in the following way: QLDataSource("Tread Depth", "34") (Use rule "Tread Depth" and pass in vehicle id "34" as an argument).

After the color rules are assigned to a region, the graphics server 240 is directly attached to a database table that contains data for regions 510a–510n and rules 520a–520m. The graphics server 240 uses the data about the region and the rule to color in the regions 142a–142j (FIG. 1) of the graphic 140. The QLDataSource method uses ODBC to attach to the database 160 and retrieve data from the database. The region utility 220 allows the developer to specify the database 160, SQL statement 460 (FIG. 4C), and rules 464. This information is stored in the QLG file.

As described above with reference to FIG. 4C, the exemplary system uses underlying data stored in a database and accessed by issuing SQL statements 460 through ODBC. The invention may also use underlying data stored in a spreadsheet. One of ordinary skill in the art can readily write spreadsheet queries using the native macro language of the spreadsheet program. A rule data structure suitable for use in conjunction with a spreadsheet is the same as the rule data structure 450 shown in FIG. 4C, except that the SQL statements 460 are replaced by spreadsheet macro language commands. Thus the same software development toolkit may be used regardless of whether the underlying data is to be stored in a database or spreadsheet.

FIG. 8 is an example of an exemplary embodiment of a spreadsheet application 800 in accordance with the invention. Spreadsheet 800 includes the graphic 140 embedded within a cell. The graphic 140 is embedded as an OLE 2.0 custom control, similar to the exemplary custom control embedded in a database program. Special functions in the application program may be implemented using the spreadsheet macro language, and the controls may be placed on the toolbar 802.

One of ordinary skill in the art will recognize that both the database and spreadsheet applications of the invention have their own advantages. Applications developed for use with underlying databases may have greater portability between database management systems through compliance with the standard ODBC interfaces. The applications are developed to comply with the ODBC client interface. The application may then be ported over to interface with any database that uses any DBMS for which an ODBC driver has already been developed (e.g., Microsoft Access). Any ODBC client can access any DBMS for which there is an ODBC driver. One of ordinary skill in the art recognizes that other equivalent methods of attaching a database, such as Access Data Objects (ADO) or Remote Data Objects (RDO).

On the other hand, those who are familiar with a given spreadsheet program may find it more convenient to program in the native macro language of the spreadsheet.

II. Tire Data Management Software Application

The development tool according to the invention may be used to develop application programs quickly and easily, in which data are displayed graphically, and the colors of individual regions of the graphic are used to convey information at a glance.

Referring again to FIG. 1, the first exemplary application program is the Vehicle Status application program 100, for tracking truck tire information. Truck tire costs are among the largest costs in maintaining a trucking fleet. The Vehicle Status program provides comprehensive tire data tracking for an entire fleet. The Vehicle Status program has the following important features:

(1) A graphic 140 depicting a truck is shown in a format that is easily recognizable. The individual tires 142a–142j are shown, and color coded to indicate the status of the tire. For example, tires 142a and 142i are green, tires 142b and 142c are blue, tires 142d and 142e are yellow, and tire 142g is red. In the example, good tires are colored green or blue. Yellow indicates caution; i.e., remedial action will soon be needed. Red indicates that there is something wrong with the tire requiring immediate action (for example, the age of the tire may be above the maximum allowed age).

(2) The regions 142a–142j of the graphic 140 may be colored by applying any of a plurality of rules. The status bar 156 allows the end user to color the tires using either (a) tire tread depth, (b) tire age, or (c) both tread depth and age as criteria. For each criterion that is available to the end-user, a respective rule data structure is included in the QLG file 500 corresponding to the graphic 140.

(3) The end-user can easily and intuitively change the status of one of the tires 142a–142j by dragging and dropping the region representing the tire to one of the three control buttons 150, 151 or 152 on the left size of the display.

Using the application development toolkit described above, a programmer could develop the Vehicle Status application quickly and easily, as described below. Referring again to FIG. 4C, an example of a rule data structure suitable for use in the Vehicle Status application is shown. In the example of FIG. 4C, the rule ID 452 is "Tread Depth." In this case one argument 454, "vehicle_id", is declared. The argument type 456 of the "vehicle_id" argument is "string". The database "vehicle.db" is specified in the database field 458.

The SQL statement "select tire_pos_n, tread_depth from tire where vehicle_id=:vehicle_id" is entered in field 460. When a vehicle is selected (as described below with reference to FIG. 10), this SQL statement is used to query the tire position and tread depth attributes for each tire of the vehicle which has as a name the value of the vehicle_id argument, within the database called "vehicle.db."

The data in the database are stored in a "regionid, data" format. For example, there may be a table that has the fields, Tire_pos_n and Tread_Depth with the entries listed in Table 1.

TABLE 1

| Tire_pos_n | Tread_Depth |
|---|---|
| 1 | 11 |
| 2 | 6 |
| 3 | 7 |
| 4 | 2 |

The SQL statement in field 460 retrieves a regionid and a datum (in this case tire_pos_n, tread_depth). The sql statement would return the data in Table 1.

In region ID field 462, the tire_pos_n column is identified as continuing the region identifier in the Region ID field 432 of dialog box 430 (FIG. 4B).

The rule declared in the Rule edit field 464 (FIG. 4C) defines the region color to be GREEN if the tread depth is greater than $10/32$ inches, YELLOW if the tread depth is greater than $6/32$ and less than $10/32$, and RED otherwise. (Colors such as RED, BLUE, GREEN, BLACK are predefined; the user may also specify colors using the coordinates to specify a specific color to paint a region, such as RGB(x,y,z) where x is the amount of RED to use (value 0–255), y is the amount of GREEN to use (value 0–255), and z is the amount of BLUE to use (0–255)). Other coordinates (e.g., hue, saturation and luminance) may also be used.

In this example the regions are painted the colors listed in Table 2.

TABLE 2

| Tire_ID | Tread_Depth | Color |
|---------|-------------|--------|
| 1 | 11 | GREEN |
| 2 | 6 | RED |
| 3 | 7 | YELLOW |
| 4 | 2 | RED |

One of ordinary skill in the art of programming could readily develop a similar rule for defining the tire color as a function of tire age, and a further rule for defining the color as a function of both age and tread depth. In the Vehicle Status application shown in FIG. 1, the "status" field 156 is used by the end user to select one of these rules. Within the application program software, the parameter 156a–156c selected by the end user is used by the QLDataSource method to determine which rule data structure 520a–520n is applied by the application to color the regions.

Figure 9:
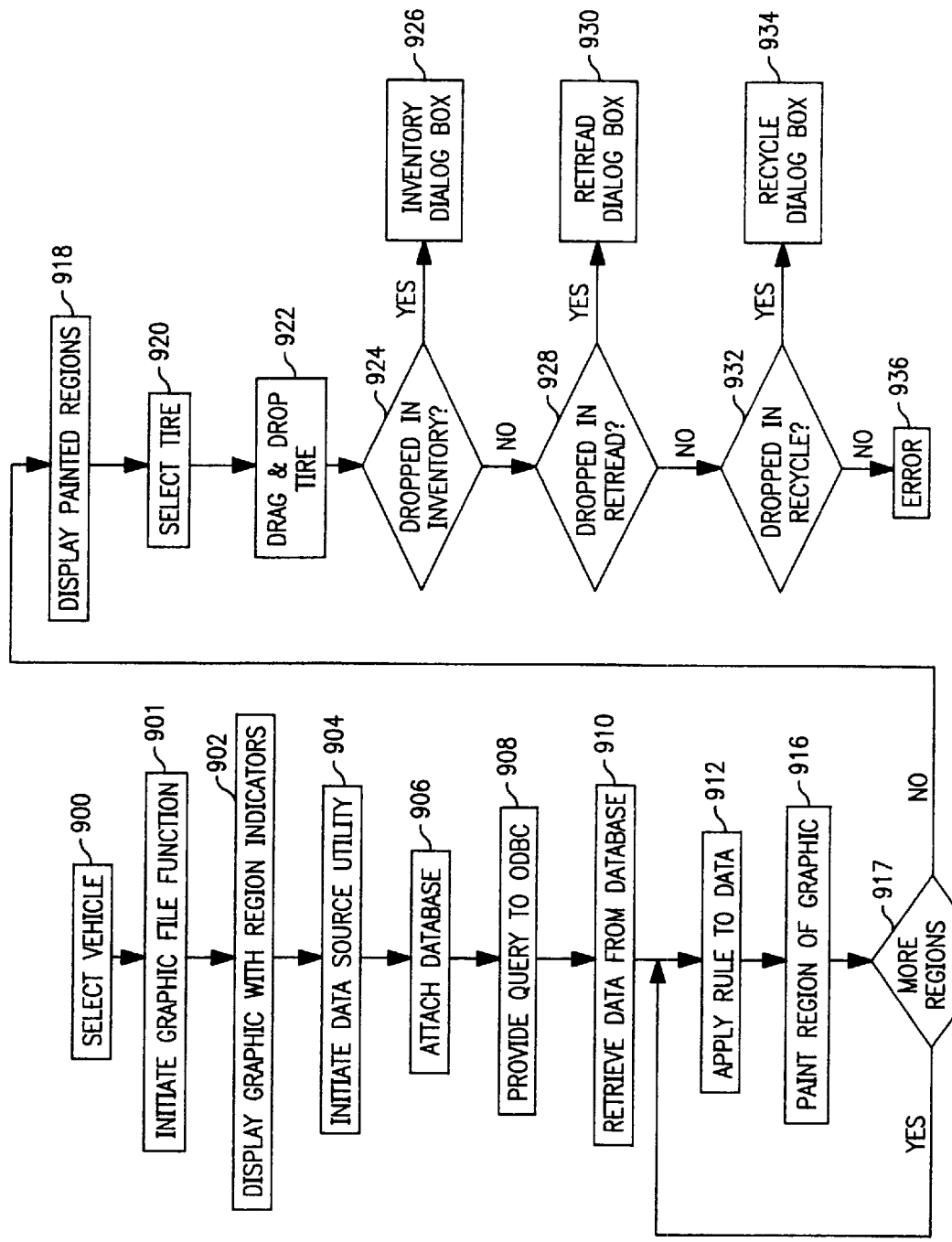
FIG. 9 is a flow chart diagram showing the application program of FIG. 1.

The operation of the Vehicle Status application is now described in detail with reference to FIGS. 1 and 9.

At step 900, the end-user initiates the vehicle status program. The toolbar 148 is displayed on the left side of the application window. By selecting the vehicle button 153, the vehicle dialog box 1000 (shown in FIG. 10) is invoked.

Figure 10:
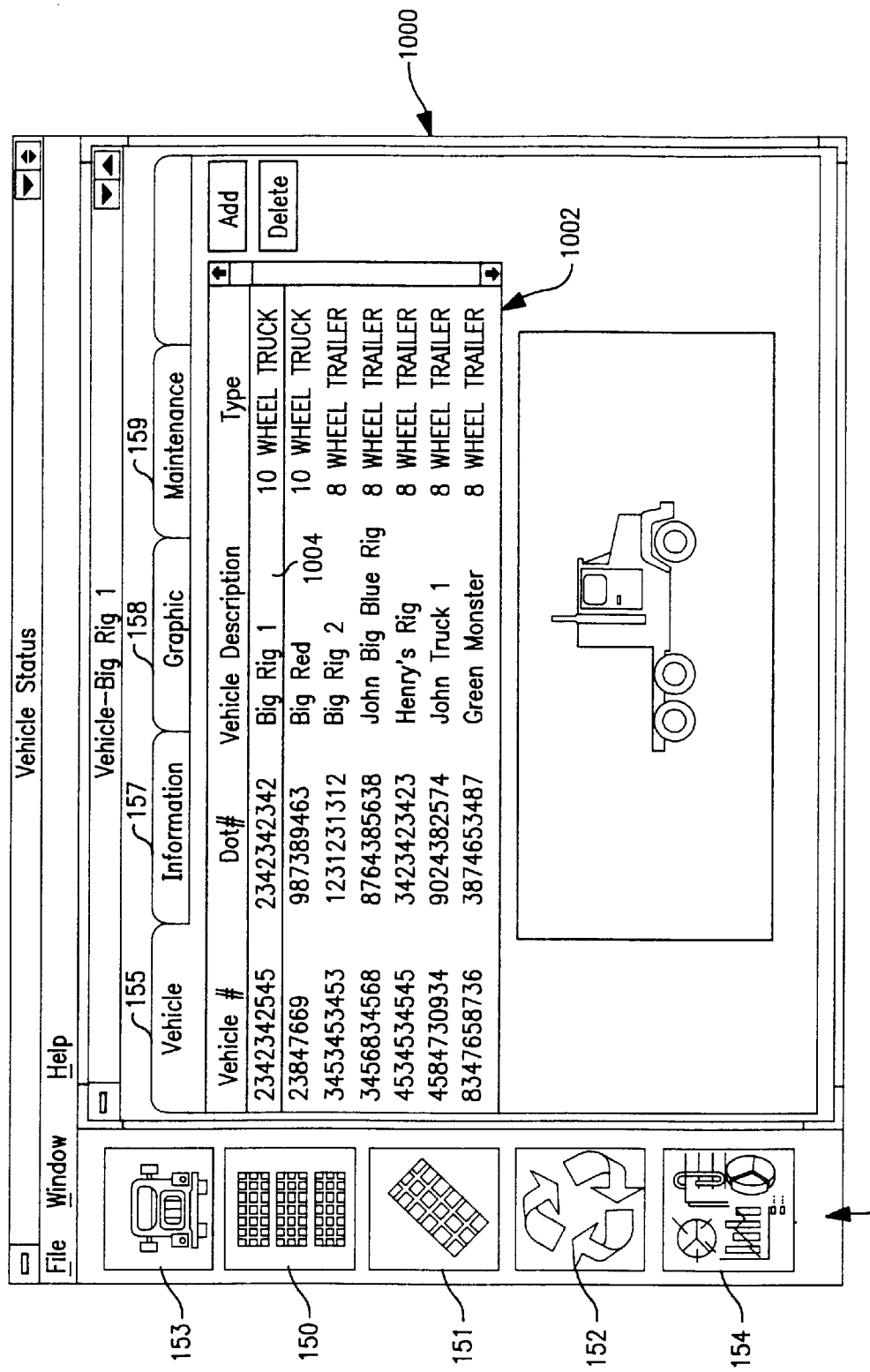

FIG. 10 shows the dialog box which contains information describing each truck in the database 160 (FIG. 1). One of the vehicles is selected by selecting one of the lines 1004 in the dialog box, and selecting the graphic tab 158. This causes execution of step 901 (FIG. 9).

At step 901 (FIG. 9) the Vehicle Status program 100 initializes the Graphics OLE 2.0 Server 240 (FIG. 2) by calling the QLGraphicsFile( ) method, described above. The server 240 is initialized. Once initialized, the server issues event messages from the RegionClick, RegionDoubleClick, RegionDrag and RegionDrop events, and the QLGraphicFile, QLShowRegions, QLRegions, QLAddRegion, QLDeleteRegion, QLRegionColor, QLPaintRegion and QLDataSource methods are available for use by the application program.

At step 902 (FIG. 9), the graphic 140 (FIG. 1) in the QLG file 500 (FIG. 5) is displayed in a picture container 141 (FIG. 1).

At step 904, the vehicle status application initiates the QLDataSource method.

At step 906, the QLDataSource method attaches the database 160 (FIG. 1).

At step 908, the QLdataSource method passes the SQL query 750 (FIG. 7) to ODBC 250 (FIG. 2).

At step 910, ODBC 250 retrieves the data from the database 160 and returns the data to QLDataSource.

At step 912, QLDataSource applies rule 770 (FIG. 7) to determine the color to paint a region.

At step 916, QLDataSource calls the QLPaintRegion method, which paints a region a specified color.

At step 917, steps 912 and 916 are repeated for each additional region.

At step 918, all of the regions are now displayed with the appropriate colors.

At step 920, the end-user begins to modify the data by selecting one of the regions 142a–142j which represents a tire.

At step 922, the end-user drags the region representing a tire over to one of the three control fields, 150–152.

At step 924, the tire is dropped in the inventory control field 150 if the user wishes to place a tire into inventory. The region drag event generates an internal message that identifies the dragged region (tire), and the region drop event generates a message that identifies the control field 150 into which the tire is dropped. Step 926 is then executed.

Figure 11:
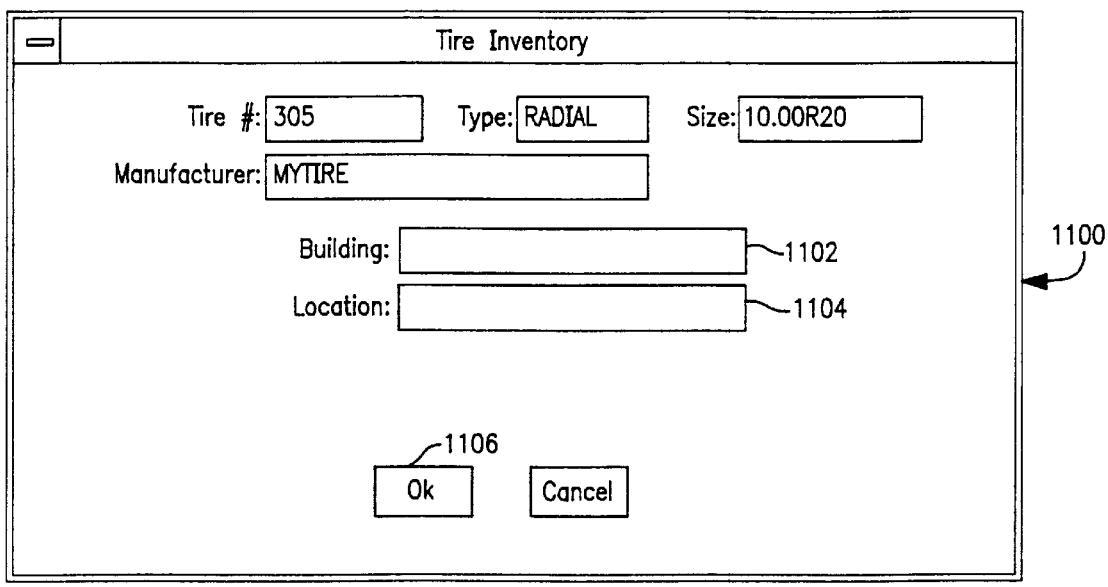

FIG. 11 shows the dialog box 1100 that the program displays at step 926 when the tire is dropped in the inventory control field 150 at step 924. The user then fills out the building edit box 1102 and location edit box 1104 and selects the "OK" button 1106. The database is modified to reflect that the tire has been removed from the vehicle and placed into the tire inventory. The tire is removed from a vehicle table of the database and placed in an inventory table.

At step 928 (FIG. 9), the tire is dropped in the retread/repair control field 151, if the user wishes to have the tire retreaded. Step 930 is then executed.

Figures 12, 13:
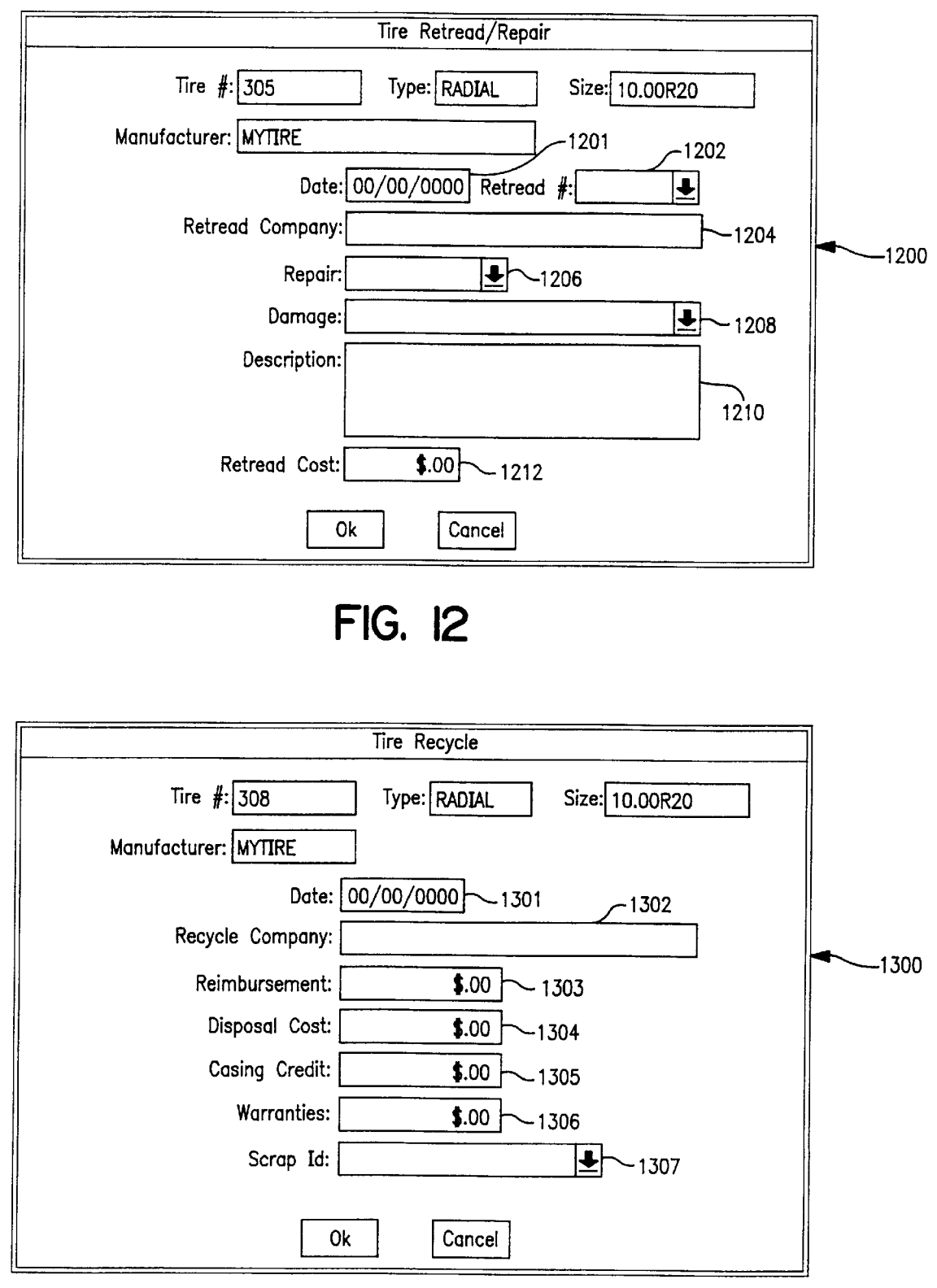

FIG. 12 shows the dialog box that is displayed at step 930. The end-user then fills out the edit boxes. The data in this box are particularly important for cost control purposes in the trucking industry. Field 1202 is used to identify how many times a given tire has been retread (Typically, a tire can only be retread three times). Fields 1204, 1206, and 1208 are used to identify who has performed the retread work, what repairs have been done, and what (if any) damage had been incurred for which a repair is initiated. Field 1212 is used to maintain cost information. Once the dialog box 1200 is completed, the database is updated to reflect that the tire has been removed from the vehicle and has been sent for retread/repair. Tires sent for retread/repair are stored in a separate table in the database.

At step 932 (FIG. 9), the tire is dropped in the recycle control field 152, if the user wishes to recycle the tire. Step 934 is then executed.

FIG. 13 shows a dialog box 1300 that is displayed at step 934. The end-user fills out the boxes 1301–1307. This dialog box captures information related to salvage costs of tires. Once dialog box 1300 is completed, the database 160 is updated to reflect that the tire has been removed from the vehicle and has been recycled. Recycled tires are identified in a separate table in the database.

At step 936 (FIG. 9), if the end-user tries to drop the region (tire) in a field other than fields 150–152, an error is indicated. For example, if the user drags the tire onto the vehicle information field 153 or the tire information field 154, the shape of the cursor changes to indicate that the user cannot drop the tire in either of these fields.

One of ordinary skill in the art of Windows programming could readily develop application code to initiate the dialog boxes shown in FIGS. 11–15 and 17–20 in response to the messages generated by the RegionClick, RegionDoubleClick, RegionDrag and RegionDrop events.

Figure 14:
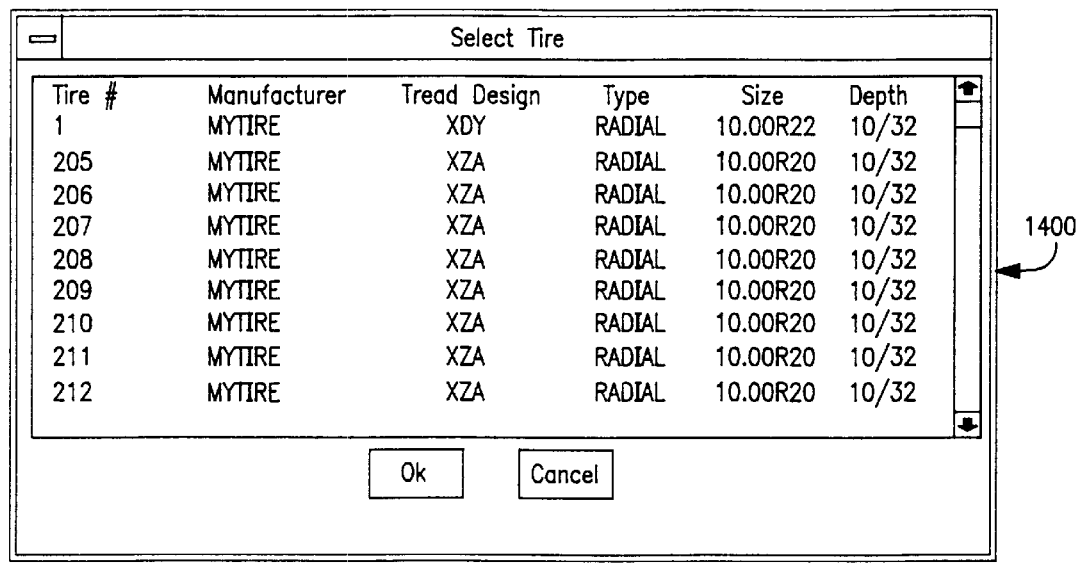

FIG. 14 shows a dialog box that is used to select a tire from inventory and transfer the tire to a vehicle. If a white (uncolored) region 142f, 142h or 142j is selected (as opposed to dropping a tire region on the field 150), dialog box 1400 is displayed. The attributes of each tire in the database inventory table are displayed in dialog box 1400. The user selects one of the tires from dialog box 1400. The tire is then added to the vehicle record and removed from the inventory table in the database 160. The region 142f, 142h or 142j is then colored according to the same rule used for the other tires.

Figure 15:
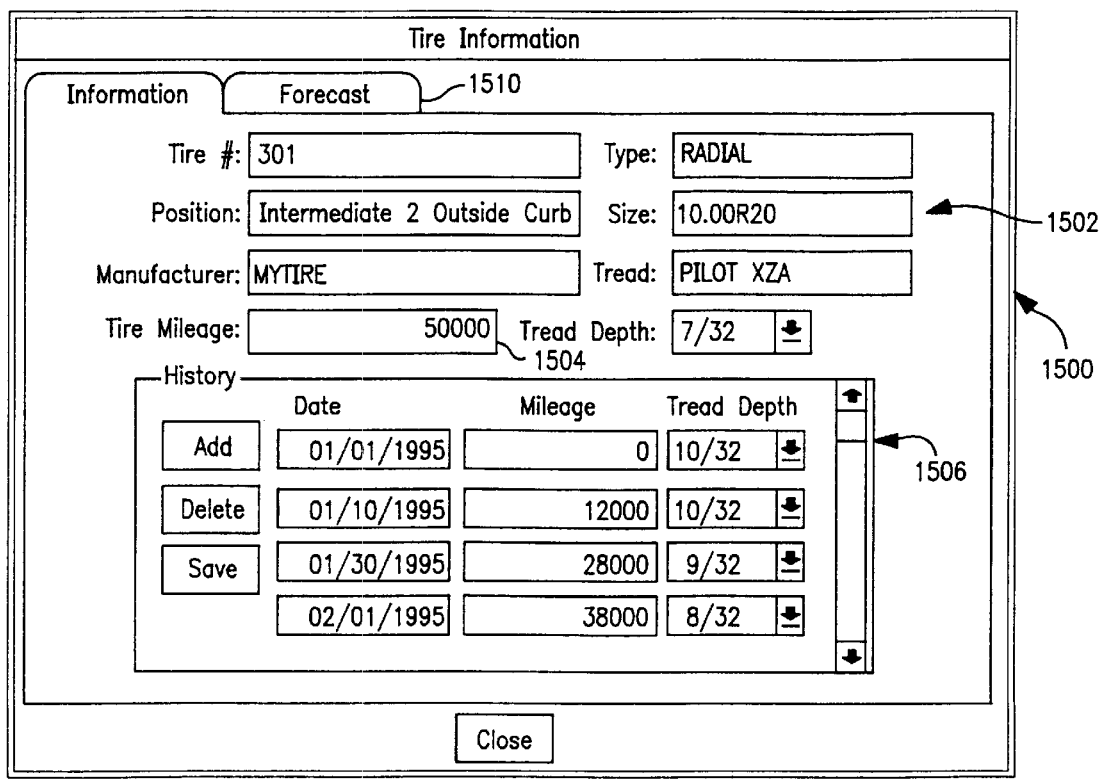
Figure 16:
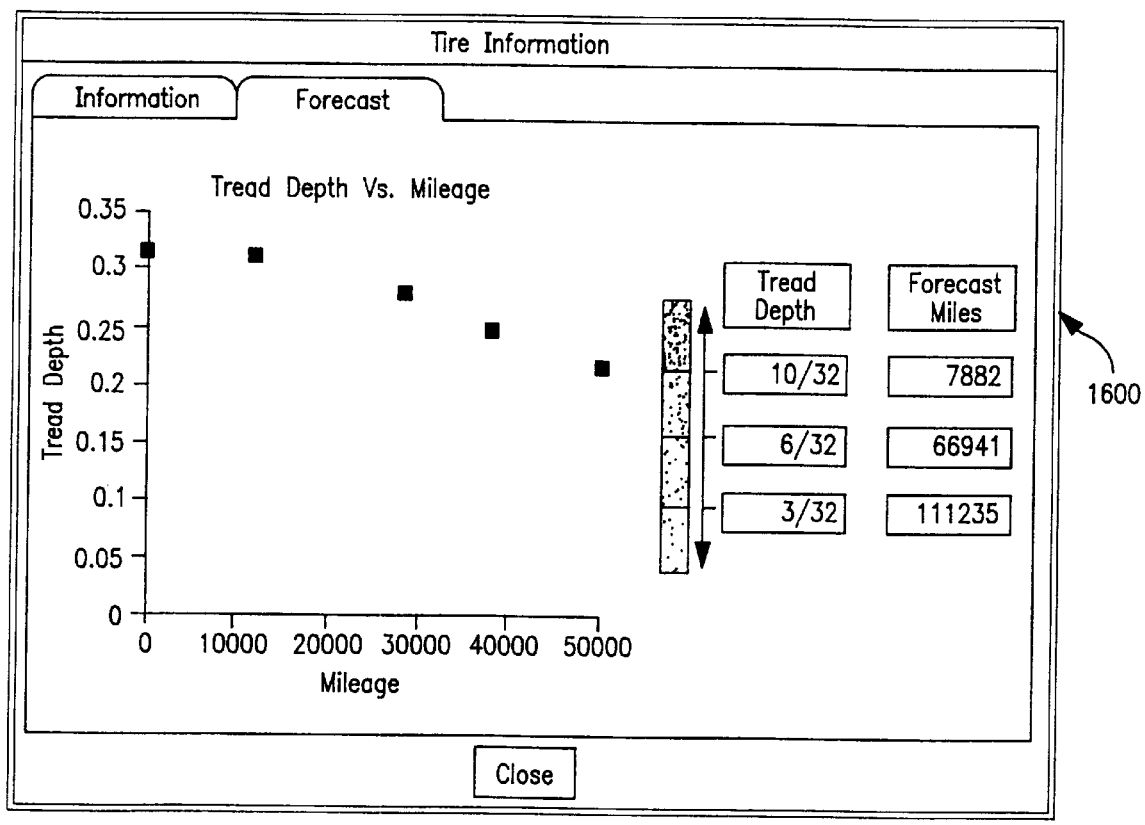
FIG. 16 is a graph of tire tread depth generated by the system shown in FIG. 1.

FIG. 15 shows a screen 1500 that is displayed if one of the colored tire regions is selected using the right button of the mouse. The tire attributes 1502, mileage 1504, and wear history 1506 are displayed. Typically, this information is updated by using the "Add" button to add a new wear history entry to the database. This automatically changes the color of the tire in the graphic shown in FIG. 1 to reflect the latest tread depth information. If the forecast tab 1510 is selected from screen 1500, then a forecast screen 1600 (FIG. 16) is displayed. FIG. 16 shows a graph of tire tread depth plotted against mileage, which may be displayed by the forecast method.

Figure 17:
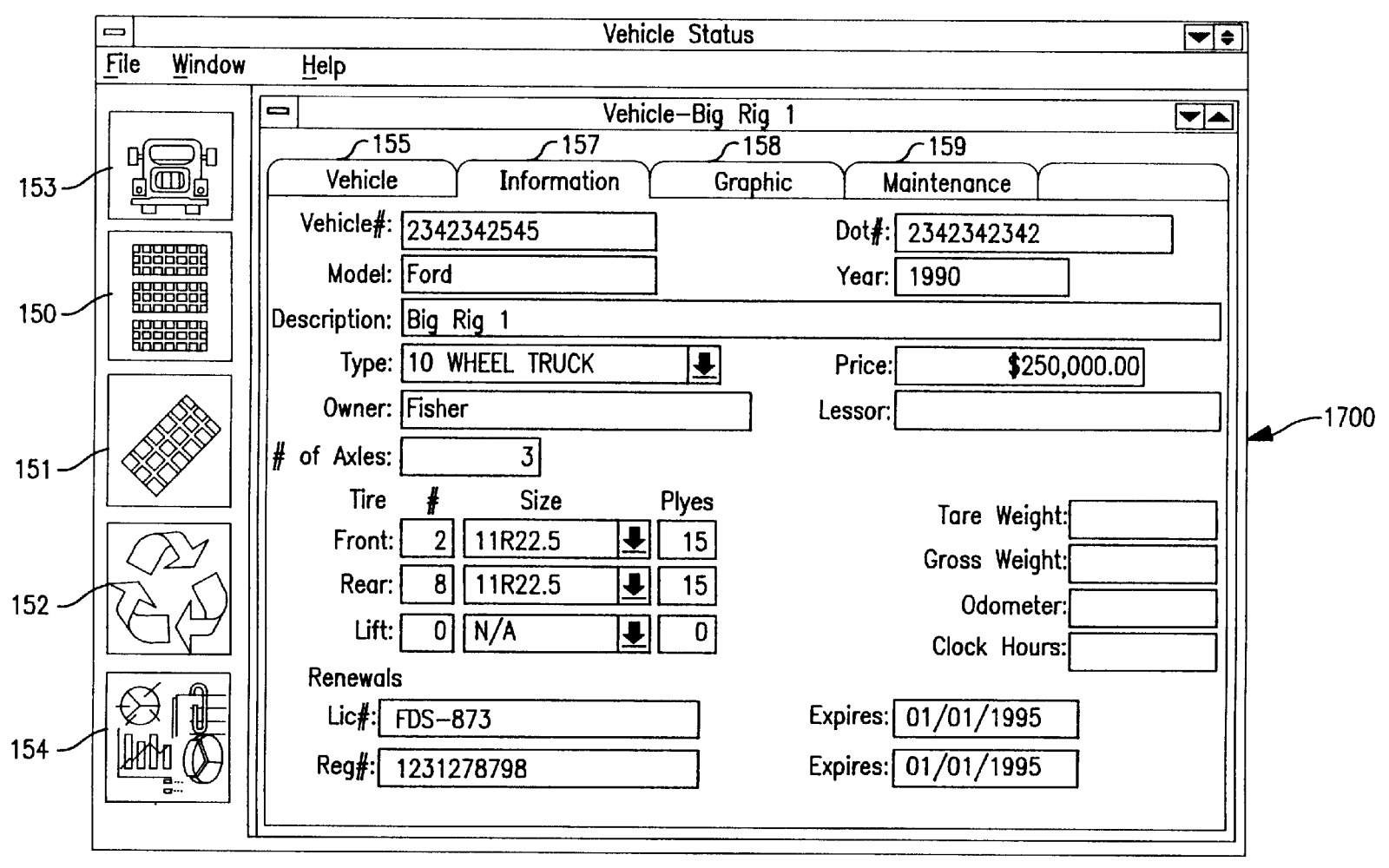

FIG. 17 shows a screen 1700 that is displayed if the information tab 157 is selected after the vehicle button 153 is selected and a truck is selected from dialog box 1002 (FIG. 10). Screen 1700 (FIG. 17) provides a view into the database 160 showing general information about the selected truck.

Figure 18:
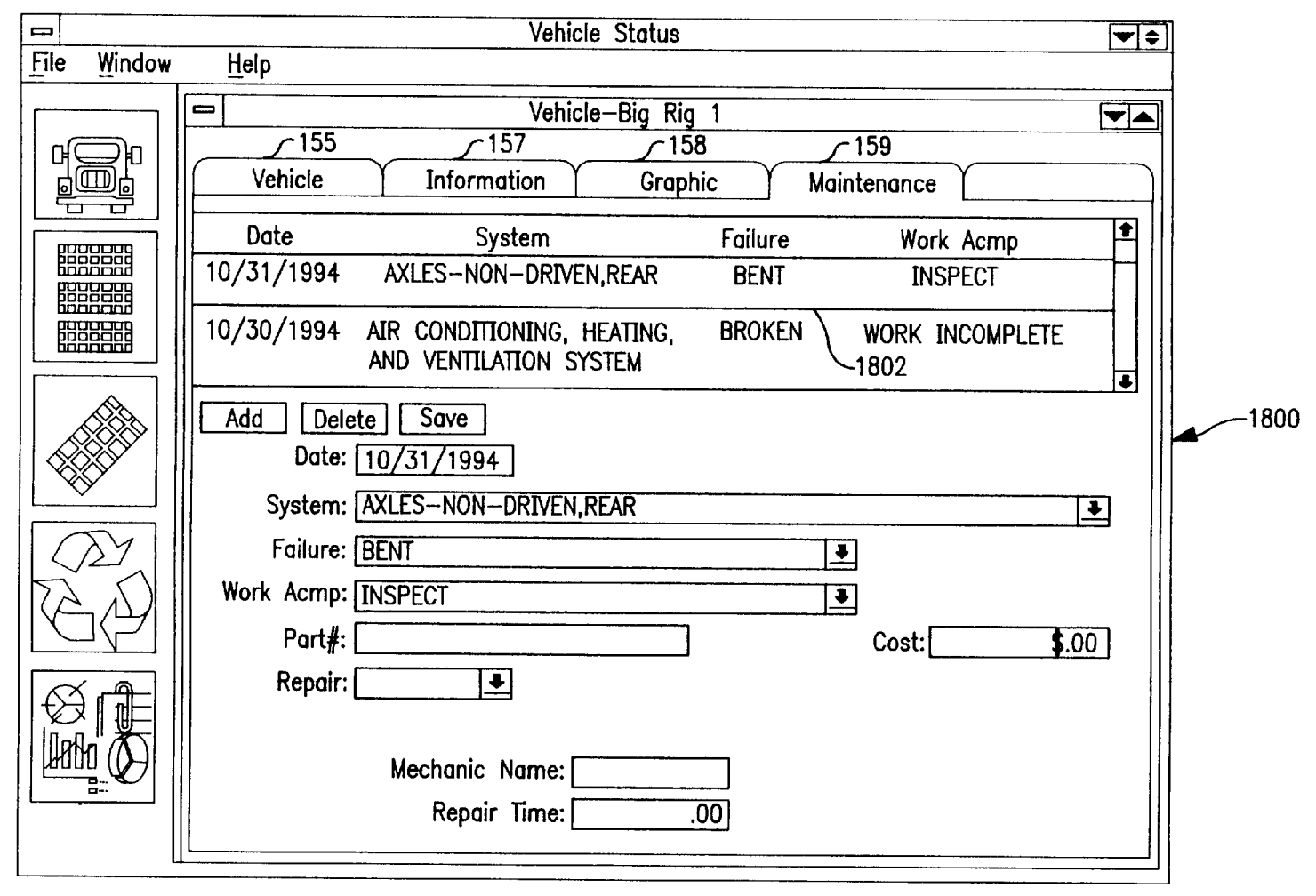

FIG. 18 shows a further screen 1800 that is displayed if the maintenance tab 159 is selected after the vehicle button 153 is selected and a truck is selected from dialog box 1002 (FIG. 10). Screen 1800 provides a view into the database 180 showing the repair history of the selected truck. The repair table of the database is particularly useful for storing data that may be relevant to tire wear. For example, the selected maintenance record for this truck shows that one of the axles had been damaged.

Thus far, the description of the vehicle status application has focused on the vehicle information displayed when the vehicle button 153 is selected. The other control buttons 150–152 or 154 may also be selected immediately upon entering the program, without going through the vehicle data.

Figure 19:
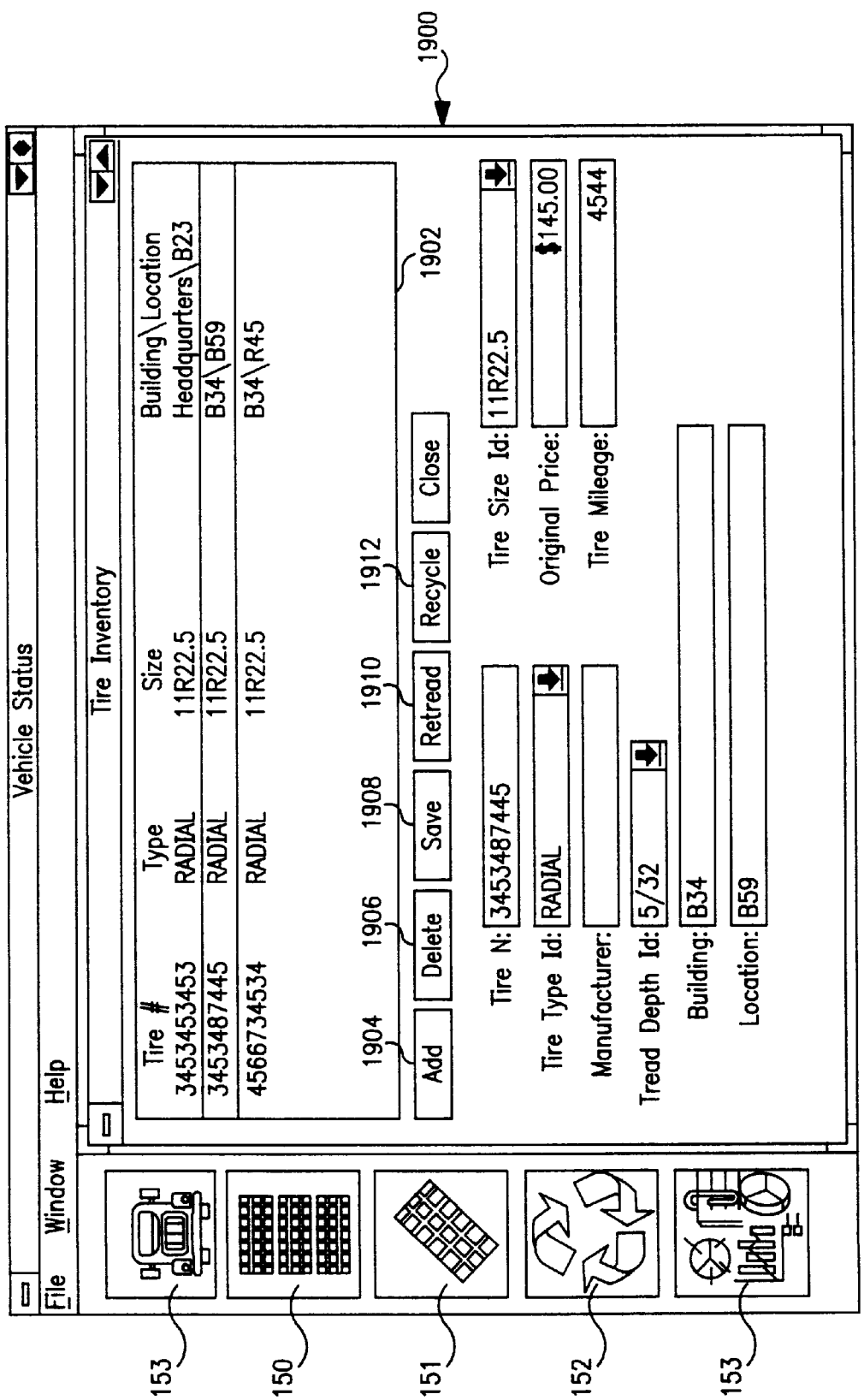

FIG. 19 shows a screen 1900 that is used to enter a new tire in inventory or transfer a tire from inventory to retread/repair or recycling. Screen 1900 is displayed if the inventory field 150 is selected (as opposed to dropping a tire region on the field 150). The end-user can scroll through the existing tires in the inventory dialog box 1902. Any of the controls 1904–1912 may be used to modify the data in the inventory table of the database. A new tire is added with the add button 1904. An incorrect entry may be deleted with the delete button 1906. An old record may be updated and saved with the save button 1908. Buttons 1910 and 1912 are used to remove a tire from the inventory table for retreading and recycling, respectively.

Figure 20:
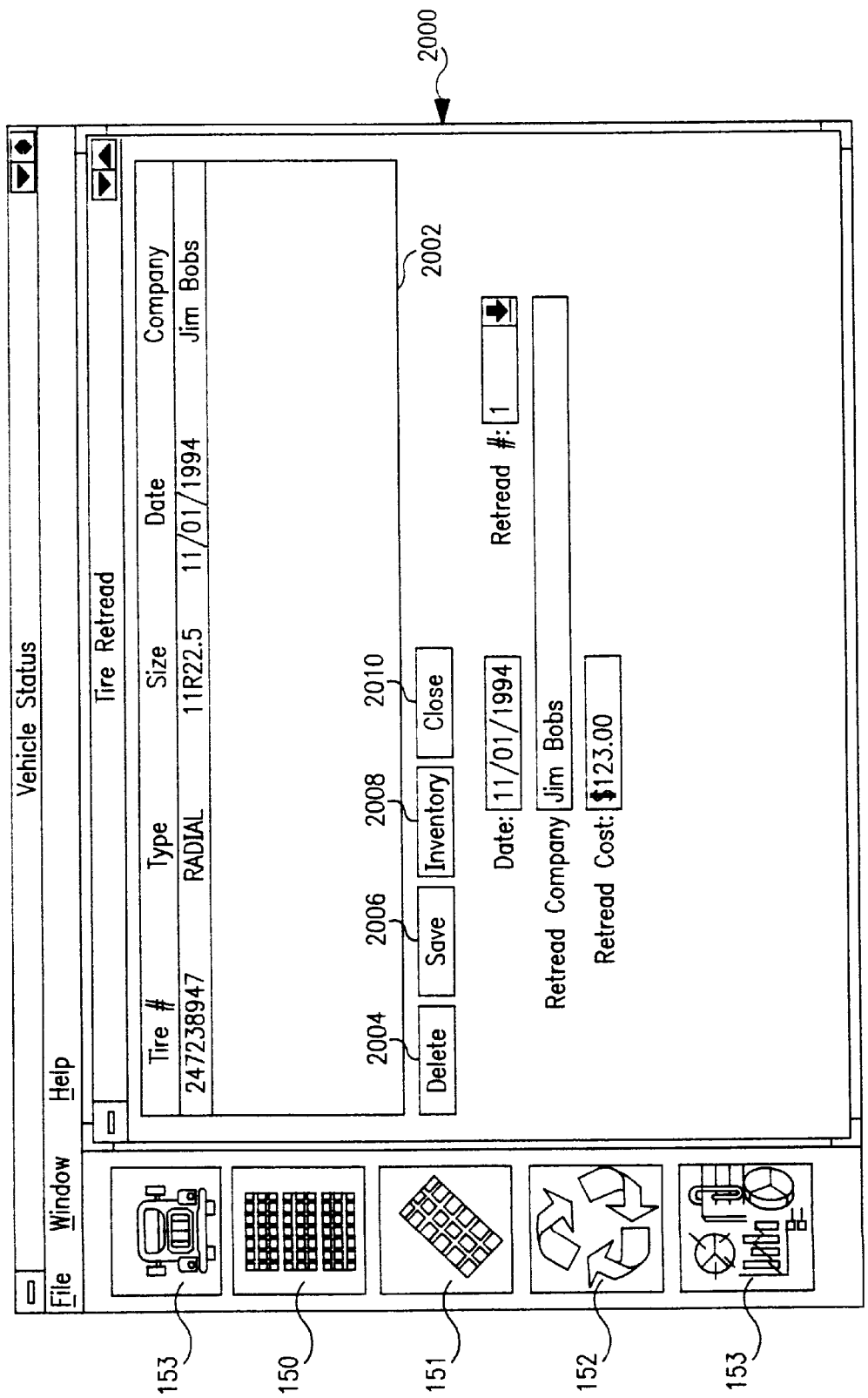

FIG. 20 shows a screen 2000 that is used to transfer a tire from the retread table of the database to the inventory table, or to update the data in the retread table. In particular, a tire in the retread table may be selected from dialog box 2002, and returned to the inventory table by selecting button 2008. Screen 2000 is displayed if the retread button 151 is selected directly upon initiating the application program.

The reports button 154 (FIG. 1) may be used to initiate generation of a variety of printed reports.

Other variations of the vehicle status application are contemplated. For example, the rule may color the tires according to tread depth and tire position. For example, the wheels that are used for steering may be colored red at a slightly greater tread depth than the other wheels, so that an extra margin of safety is provided.

The rule may also color tires differently based on the manufacturer or model. If age is used to determine color, then low quality tires may be colored red at a younger age than high quality tires.

One of ordinary skill in the art can readily apply a software development toolkit (shown in FIG. 2) according to the invention to develop other application programs which apply rules to dynamically update the colors of selected regions in arbitrary, user defined graphics.

III. Tire Depth Data Acquisition and Processing System

The present invention includes a system and method for electronically capturing and processing data values for the tread depth of a tire. The invention overcomes two problems associated with manual collection of tire tread depth data in the prior art: (1) the slow speed of manual data recording; and (2) the inaccuracy of manually reading a gage and manually recording the result. In the exemplary embodiment of the invention, the depth data are collected by a sensor and transmitted electronically to a computer on which the Vehicle Status application program (described above in Section II) is running. The data are automatically stored and processed by the Vehicle Status application program. Because the depth data are electronically collected and directly input to the computer, user errors associated with reading a manual gage and transcribing (recording) the value on the gage in the prior art are eliminated. In addition, the full capabilities of the Vehicle Status program, as set forth above, are included, and are not described again in detail.

Figure 21:
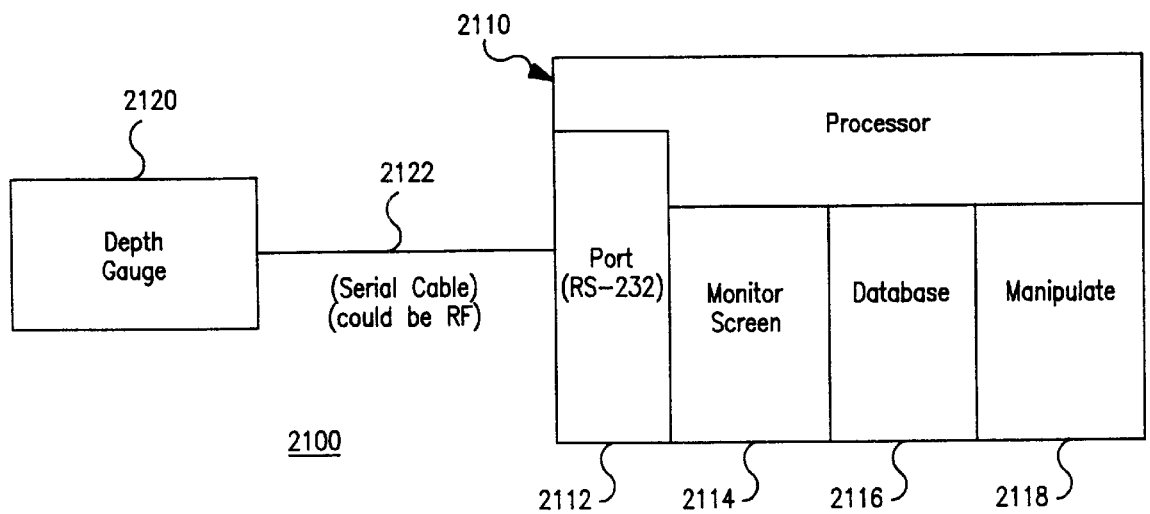
FIG. 21 is a block diagram of an exemplary system for measuring and processing tire depth data.

FIG. 21 is a block diagram of the exemplary system 2100. The exemplary system includes sensor which is a commercially available mechanical depth gage 2120, such as the Depthmatic Digital Depth Gage or the Bowers Depthmatic Rivet Gage, both distributed by the Fowler Co., Inc. of Newton, Mass., or a depth gage manufactured by the Sylvac Company of Switzerland. These gages have previously been used in airplane construction, for measuring rivet depth. The exemplary depth gage has a cable connected thereto, with an RS-232-C connector at the other end of the cable for connection to the RS-232-C serial port 2112 of a computer 2110. The Vehicle Status Application 2116 runs on the computer 2110.

Figure 22:
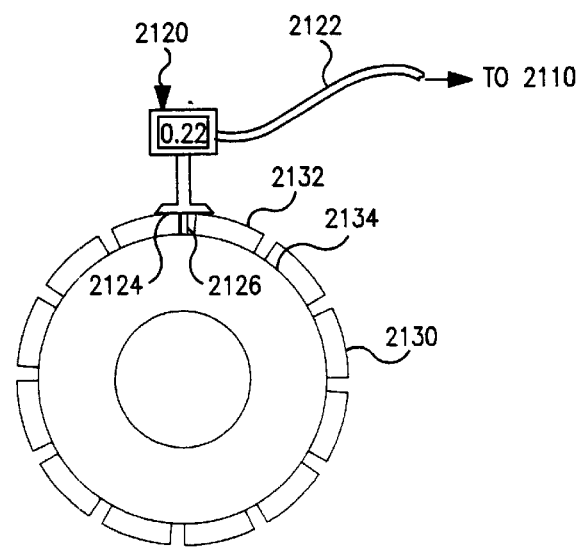
FIG. 22 is a diagram showing the depth gage of FIG. 21 in use while measuring the depth of a tire tread.

FIG. 22 is a diagram of the depth gage 2120 in use while measuring the depth of the tread of a tire 2130. The depth gage 2120 has a base 2124 (a reference surface) and a rod 2126, or probe, extending therefrom. The gage 2120 has a cable 2122 extending therefrom, with an RS-232-C connector at the end of the cable. The depth gage 2120 produces an output signal on cable 2122 representing the displacement of the rod 2126 relative to the base 2124. The depth gage 2120 is placed against the outer diameter 2132 of a tire with the depth gage rod 2126 being inserted between the tire treads. The base 2124 of the depth gage 2120 is moved toward the tire tread until the base 2124 is flat against the top 2132 of the tire tread and can move no further. The depth gage rod 2126 is moved (e.g., by pushing a plunger) to the bottom 2134 of the tread. The movement of rod 2126 relative to the base 2124 causes the depth gage 2120 to generate a depth value. When the user activates a control (e.g., presses a button) on gage 2120, the gage transmits the tread depth data signal over the cable 2122.

The depth gage 2120 is connected to a computer 2110. The connection between the depth gage and computer may be via serial cable 2122, as in the exemplary embodiment, or other communications medium, such as via a radio frequency or infrared wireless link.

Processor 2110 may be a desktop computer, a laptop computer, or a handheld (palmtop) computer. A laptop computer or palmtop computer is preferred, because a completely portable system is desirable. If a desktop computer is used, then a wireless communications link (not shown) is preferred to couple gage 2120 to and the computer. The connector on the gage would then be coupled to an RF or IR transmitter, and a corresponding RF or IR receiver would be connected to the desktop computer.

Figure 23:
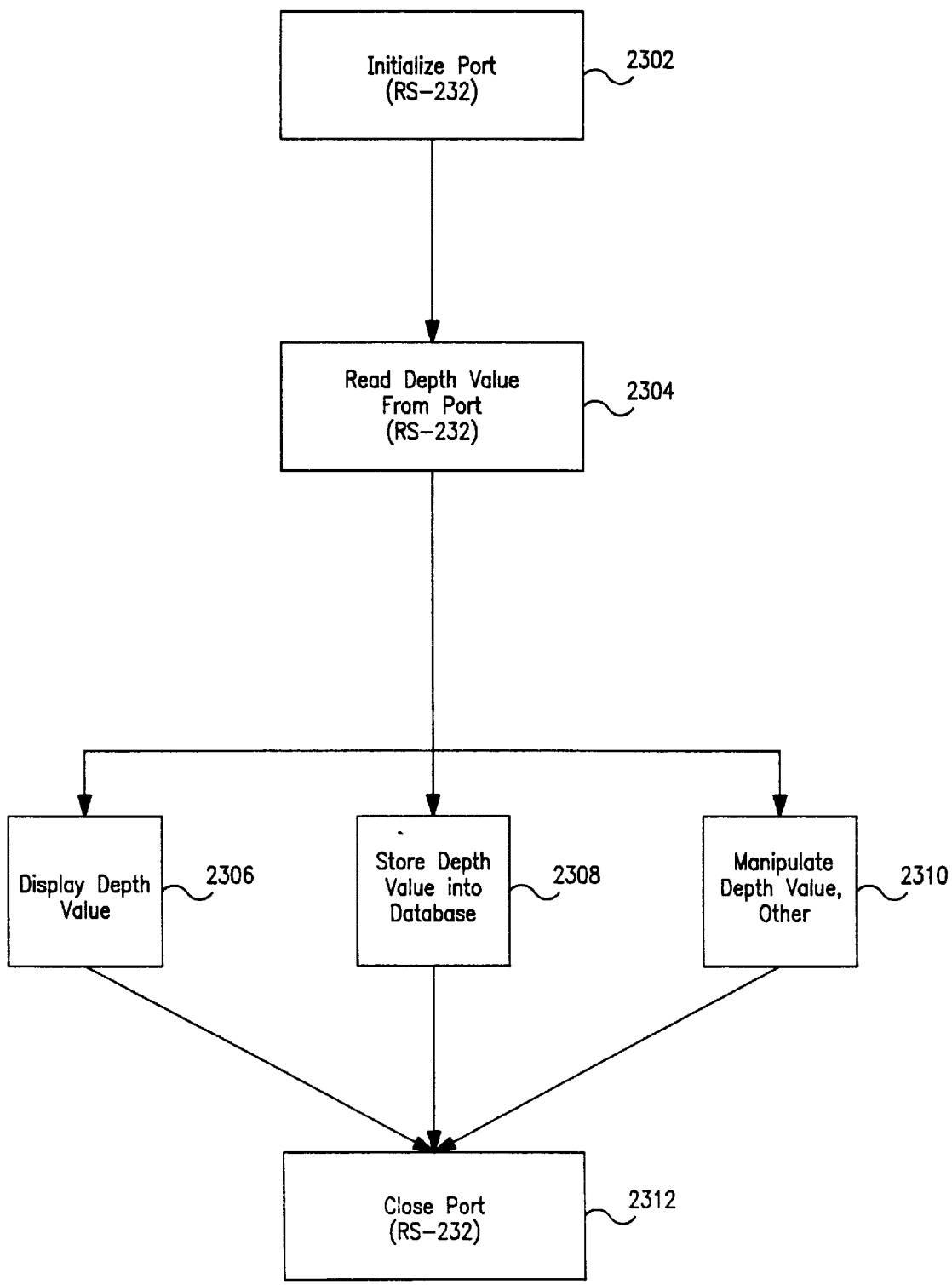
FIG. 23 is a flow chart diagram showing the transfer of a tread depth value from sensor to the tire database.
Figure 24:
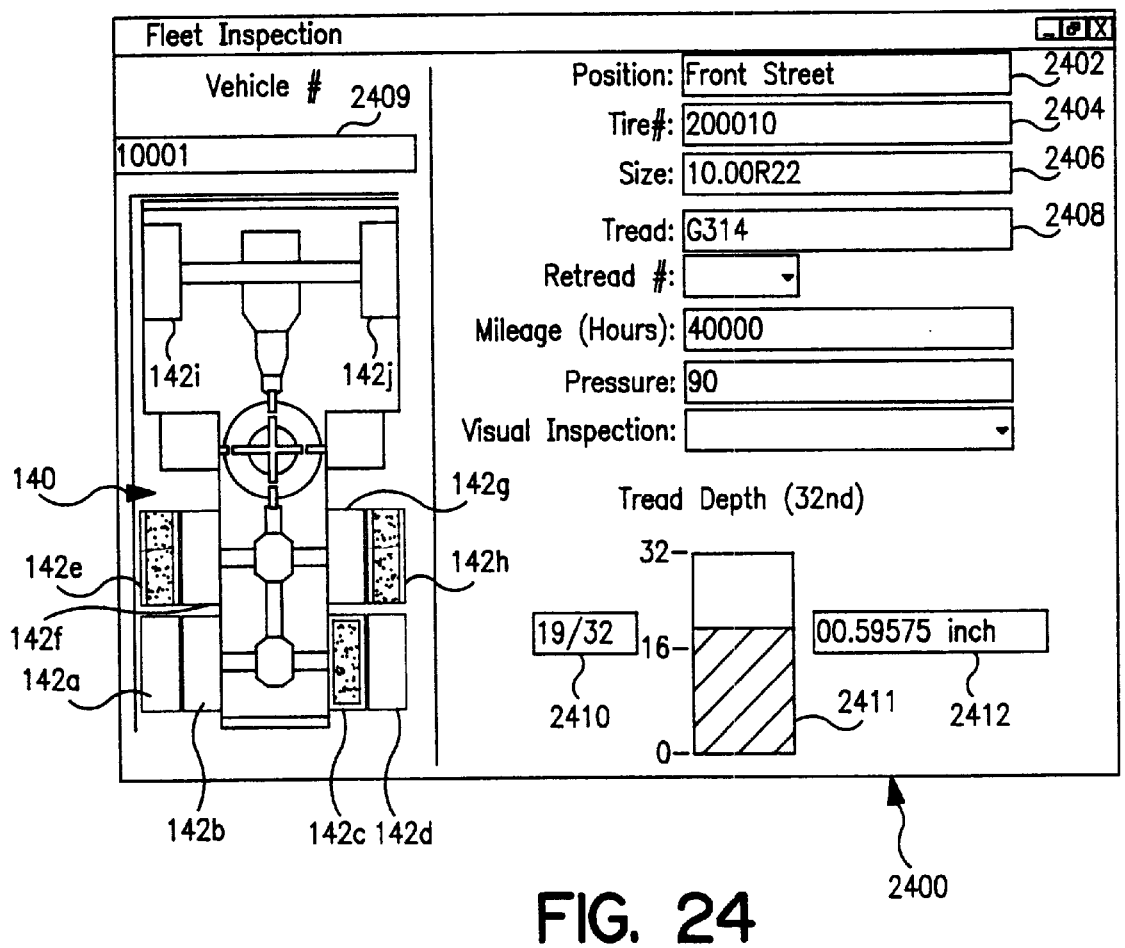
FIG. 24 is a display used to receive the tread depth data.

FIG. 23 is a flow chart diagram showing the steps of collecting and processing the tire depth data. At step 2302, the serial port 2112 is initialized when the user attaches the sensor cable 2122 to the serial port 2112 and the user invokes the tread depth data collection display (shown in FIG. 24). If the tire already is in the database, the user selects the tire by clicking (selecting) the region 142a–142j representing that tire, and the information in the database for that tire are displayed. Otherwise, the user enters the identification information 2404 for the tire. Once the port is initialized and a tire selected, the software in processor 2110 waits for an interrupt from the RS-232 port. At step 2304, when the user activates the control of gage 2120 to transmit a value, processor 2110 detects data at the serial port 2112 and reads the depth value from port 2112. At step 2306, the data are displayed on monitor 2114; the display may appear as shown in FIG. 24. At step 2308, the data are stored into the tire database 2116.

At step 2310, the user can manipulate the depth value in a number of ways. The computer performs some or all of the following processing functions using the data as transmitted by the depth gage: data storage, manipulation, compilation, extraction, comparison, sorting, and extrapolating to estimate future tire performance data. These functions are described above in the general description of the Vehicle Status application program in Section II.

At step 2312, when the tread depth for each tire has been measured and stored in the database, the gage is disconnected from the serial port and the port is closed.

FIG. 24 is a diagram showing an exemplary display used by the Vehicle Status Program to capture a tire tread depth value. The computer 2110 displays the data. This display is on a monitor 2114 or other visual device (not shown) connected to the computer either through cable or radio frequency (or other). The visual representation of the data may take the form of (1) color, (2) numerical, (3) words and/or (4) moving diagram/chart.

For example, as shown on the left side of display 2400, the computer may display a graphic depicting the bottom of a truck. The various tires 142a–142j of the truck are represented by colored regions, each respective color corresponding to the tread depth of the tire. The user can define the ranges of tread depth represented by each color, as described above. Three colors may be used to represent the tread depth (e.g., Green for good, Yellow for just acceptable, and Red for unacceptable). Optionally, a larger number of colors may be used to represent additional attributes. For example, six colors could accommodate three tread depth ranges and two age ranges.

Display 2400 also includes a numerical display of the tread depth in fraction form 2410, in decimal form 2412, or in histogram form 2411.

Although the exemplary depth gage is a mechanical sensor, it is contemplated that other types of sensors may be used to sense the tread depth. These may include, for example, optical or ultrasonic sensors.

In addition to the tire tread depth, other parameters may be electronically collected and automatically transmitted to the computer for direct entry into the Vehicle Status program. For example, a chip containing a read-only memory (ROM) may be installed in, on, or proximate to, the tire, for transmitting identification information corresponding to the tire. For example, the chip may identify, the position 2402, the tire ID number 2404, the tire size 2406, the tread type 2408, or other parameters. These data may be transmitted to the Vehicle Status Program to further reduce data entry time and enhance the accuracy of data recording. Similarly, identification information for the tire could be optically coded on the tire, and read by an optical scanner to automatically identify the tire before measuring the tread depth.

Further, a clock chip can be provided as part of the depth gage, or as a separate input to the computer, for providing a time stamp to the computer each time a tread depth value is provided to the database. The time stamp data enhances the integrity of the data collected, and enables the fleet owner to prove (1) that proper tire maintenance procedures are being applied at the proper times and (2) the actual times when problems are detected. This time stamp would be independent of the system clock in the computer, which the user can easily tamper with or manipulate. Moreover, one of ordinary skill in the art of programming could readily construct code to render the externally provided time stamp data read-only, to prevent tampering.

Although tread depth may be measured by collecting a single depth value, one of ordinary skill in the art of programming could readily practice the invention with several depth values being collected for each tire, and an automatic averaging process performed within the database or spreadsheet.

The attached appendix includes exemplary software for capturing the tread depth values and providing the tread depth values to the tire maintenance data application program.

Although the invention has been described with reference to exemplary embodiments, it is not limited thereto. Rather, the appended claims should be construed to include other variants and embodiments of the invention which may be made by those skilled in the art without departing from the true spirit and scope of the present invention.

```
frmTireInspection - 1
Const DVL_NUM_CHAR_FROM_DEPTH = 10
Const PDQ_EV_CD = 5
Const PDQ_EV_CTS = 3
Const PDQ_EV_DSR = 4
Const PDQ_EV_RING = 6
Const PDQ_EV_RECEIVE = 2
Const PDQ_EV_SEND = 1
Const PDQ_EV_XFER = 100
Dim sInDepth As String
Dim dInDepth As Double
Dim iTreadDepthtMid As Integer
Dim iBottomGaugex As Integer
Dim iBottomGaugey As Integer
Dim iyper32 As Integer
Dim iCurrentTire as Integer
Private Sub Form Load()
```

-continued

```
        textVehicleN.Text = "10001"
        iTreadDepthMid = txtTreadDepth.Height / 2
        iBottomGaugey = gaugeTreadDepth.Top = gaugeTreadDepth.Height
        iyper32 =0 BottomGaugex = gaugeTreadDepth.Left + gaugeTreadDepth.Width
        iyper32 = gaugeTreadDepth.Height / 32
        labelTire(0).BackColor = RGB(255, 255, 0)
        labelTire(1).BackColor = RGB(0, 0, 255)
        labelTire(2).BackColor = RGB(0, 0, 255)
        labelTire(3).BackColor = RGB(255, 255, 0)
        labelTire(4).BackColor = RGB(0, 255, 0)
        labelTire(5).BackColor = RGB(0, 0, 255)
        labelTire(6).BackColor = RGB(0, 0, 255)
        labelTire(7).BackColor = RGB(0, 0, 255)
        labelTire(8).BackColor = RGB(255, 0, 0)
        labelTire(9).BackColor = RGB(0, 255, 0)
        PDQComml.CommPort = 1
        PDQComml.Settings = "4600,E,7,2"
        PDQComml.InputLen = 0
        PDQComml.RThreshold = DVI_NUM_CHAR_FROM_DEPTH
        PDQComml.PortOpen = True
End Sub
Private Sub Form_Unload(Cancel As Integer)
        PDQComml.PortOpen = False
End Sub
Private Sub labelTire_Click(Index As Integer)
        iCurrentTire = Index
        Select Case Index
            Case 0
                textposition.Text = "Front Curb"
                textTireN.Text = "200009"
                textSize.Text = "10.00R22"
                textTread.Text = "G314"
                textMileage.Text = "40000"
                textPressure.Text = 90
            Case 1
                textPosition.Text = "Front Street"
                textTireN.Text = "200010"
frmTireInspection - 2
                textSize.Text = "10.00R22"
                textTread.Text = "G314"
                textMileage.Text = "40000"
                textPressure.Text = 90
            Case 2
                textPosition.Text = "Intermediate 1 Outside Curb"
                textTireN.Text = "200002"
                textSize.Text = "10.00R22"
                textTread.Text = "G314"
                textMileage.Text = "40000"
                textPressure.Text = 90
            Case 3
                textPosition.Text = "Intermediate 1 Inside Curb"
                textTireN.Text = "200004"
                textSize.Text = "10.00R22"
                textTread.Text = "G314"
                textMileage.Text = "40000"
                textPressure.Text = 90
            Case 4
                textPosition.Text = "Intermediate 1 Inside Street"
                textTireN.Text = "200006"
                textSize.Text = "10.00R22"
                textTread.Text = "G314"
                textMileage.Text = "40000"
                textPressure.Text = 90
            Case 5
                textPosition.Text = "Intermediate 1 Outside Street"
                textTireN.Text = "200008"
                textSize.Text = "10.00R22"
                textTread.Text = "G314"
                textMileage.Text = "40000"
                textPressure.Text = 90
            Case 6
                textPosition.Text = "Rear Outside Curb"
                textTireN.Text = "200001"
                textSize.Text = "10.00R22"
                textTread.Text = "G314"
                textMileage.Text = "40000"
                textPressure.Text = 90
            Case 7
                textPosition.Text = "Rear Inside Curb"
                textTireN.Text = "200003"
```

-continued

```
                    textSize.Text = "10.00R22"
                    textTread.Text = "G314"
                    textMileage.Text = "40000"
                    textPressure.Text = 90
                Case 8
                    textPosition.Text = "Rear Inside Street"
                    textTireN.Text = "200005"
                    textSize.Text = "10.00R22"
                    textTread.Text = "G314"
                    textMileage.Text = "40000"
                    textPressure.Text = 90
                Case 9
                    textPosition.Text = "Rear Outside Street"
                    textTireN.Text = "200007"
                    textSize.Text = "10.00R22"
                    textTread.Text = "G314"
                    textMileage.Text = "40000"
                    textPressure.Text = 90
        End Select
End Sub
Private Sub PDQComm1_OnComm()
frmTireInspection - 3
Dim iTreadDepth As Integer
        Select Case PDQComm1.CommEvent
            Case PDQ_EV_RECEIVE
                sInDepth = Left(PDQComm1.Input. DVI_NUM_CHAR_FROM_DEPTH - 1)
                dInDepth = Va;(sInDepth)
                txtTreadDepth.Text = Format(dInDepth, "00.00000") + "inch"
                iTreadDepth = Abs(dInDepth) / 0.03125
                textTreadDepth32 = Format(iTreadDepth, "##0") + "/32 "
                If iTreadDepth < 4 Then
                    labelTire(iCurrentTire).BackColor = RGB(255, 0, 0)
                    gaugeTreadDepth.ForeColor = RGB(255, 0, 0)
                    txtTreadDepth.BackColor = RGB(255, 0, 0)
                    textTreadDepth32.BackColor = RGB(255, 0, 0)
                ElseIf iTreadDepth < 12 Then
                    labelTire(iCurrentTire).BackColor = RGB(255, 255, 0)
                    gaugeTreadDepth.ForeColor = RGB(255, 255, 0)
                    txtTreadDepth.BackColor = RGB(255, 255, 0)
                    textTreadDepth32.BackColor = RGB(255, 255, 0)
                ElseIf iTreadDepth < 25 Then
                    labelTire(iCurrentTire).BackColor = RGB(0, 255, 0)
                    gaugeTreadDepth.ForeColor = RGB(0, 255, 0)
                    txtTreadDepth.BackColor = RGB(0, 255, 0)
                    textTreadDepth32.BackColor = RGB(0, 255, 0)
                Else
                    labelTire(iCurrentTire).BackColor = RGB(G, 0, 255)
                    gaugeTreadDepth.ForeColor = RGB(0, 0, 255)
                    txtTreadDepth.BackColor = RGB(0, 0, 255)
                    textTreadDepth32.BackColor = RGB(0, 0, 255)
                End If
                txtTreadDepth.Top = iBottomGaugey - (iTreadDepthMid + (iTreadDepth * iyper32))
                textTreadDepth32.Top = txtTreadDepth.Top
                If iTreadDepth >= gaugeTreadDepth.Max Then
                    gaugeTreadDepth.Value = gaugeTreadDepth.Max
                Else
                    gaugeTreadDepth.Value = iTreadDepth
                End If
        End Select
End Sub
```

What is claimed:

1. A system for measuring and processing tire tread depth data, comprising:

sensing means for measuring a tread depth of a tire and producing a tread depth signal representing the tire tread depth;

communications means coupled to the sensing means for receiving the tread depth signal and transmitting the tread depth signal to a computing means, time stamp generating means coupled to the sensing means for identifying a time at which the tread depth signal is transmitted to the computing means, and transmitting the time with the tread depth signal, and said computing means including database means i) for receiving the tread depth signal and the time, and ii) for storing an entry associating the tire tread depth and the time with the tire.

2. A system according to claim 1, wherein the sensing means is a mechanical sensor.

3. A system according to claim 2, wherein the sensing means is a rivet depth gage.

4. A system according to claim 1, wherein the communications means include means for transmitting the tread depth signal to a serial port of the computing means.

5. A system according to claim 1, further comprising means for automatically sensing an identifier of the tire, and transmitting the identifier with the tread depth signal, wherein the identifier is stored as part of the entry in the database means.

6. A system according to claim 1, wherein the database means comprises a user defined database or spread sheet which stores data representing a plurality of tires, said plurality of tires including the tire, and the computing means further includes:

means for defining a graphic that is displayed by the computer, the graphic defined by the user and representing each of the plurality of tires represented by the data;

means for randomly selecting a region of the graphic;

means for linking the selected region of the graphic to a corresponding one of the plurality of data in the database representing tires;

means responsive to the tread depth signal for changing the corresponding one of the plurality of data in the database when the tread depth signal is transmitted by the communications means.

7. A system according to claim 6, wherein the graphic includes a representation of the bottom of a truck on which the plurality of tires are installed, the graphic including a respective region representing each respective one of the plurality of tires.

8. A system according to claim 7, wherein an attribute of each region is varied, based on a respective tread depth measured for each respective tire by the sensing means.

9. A system according to claim 8, wherein the attribute is color.

10. A system according to claim 9, wherein the color is defined by the user.

11. A system according to claim 6, wherein a color is assigned to the selected region of the graphic based on at least one of tire tread depth and age of a respective one of the plurality of tires.

12. A system according to claim 7, wherein the user varies the representation of the bottom of a truck.

13. A system according to claim 8, wherein the attribute is indicated by a hatched pattern.

14. A system according to claim 8, wherein the attribute is indicated by shading.

15. A system according to claim 9, wherein the color is selected from at least three colors.

16. A system according to claim 1, wherein the time stamp generating means is independent of the computing means.

17. A system for collecting and processing tire tread depth data from a plurality of tires, comprising:

sensing means for measuring a tread depth of one of the plurality of tires and producing a tread depth signal representing the tire tread depth;

communications means coupled to the sensing means for receiving the tread depth signal and transmitting the tread depth signal to a serial port, computing means for receiving the tread depth signal, said serial port being located on said computing means, said computing means including:

i) at least one of a database and a spread sheet for storing a respective entry associating a respective tire tread depth with each one of the plurality of tires, ii) means for defining a graphic that is displayed by the computer, the graphic defined by a user and representing each of the plurality of tires, the graphic including a representation of the bottom of a truck on which the plurality of tires are installed, the graphic including a respective region representing each respective one of the plurality of tires, iii) means for randomly selecting a region of the graphic, iv) means for linking the selected region of the graphic to a corresponding one of the plurality of data representing tire tread depth in the database or spreadsheet, and v) means responsive to the tread depth signal for changing the corresponding one of the plurality of data in the database or spreadsheet when the tread depth signal is transmitted by the communications means, and means for varying a color of each region, based on the respective tread depth stored in the database or spreadsheet for each respective tire.

18. A system for managing data representing a plurality of vehicle tires, comprising:

a computer having a display and including at least one of a user defined database and a spread sheet which stores the data representing vehicle tires, the data including at least one of the group consisting of tire tread depth data and tire age data;

means for defining a graphic that is displayed by the computer, the graphic defined by the user and representing the vehicle, the vehicle including each of the plurality of vehicle tires represented by the data;

means for identifying a plurality of regions of the graphic, each region representing a respective one of the vehicle tires;

means for linking each identified region of the graphic to a corresponding one of the plurality of data in the database representing vehicle tires;

means for inputting a change to one of the data linked to a randomly selected one of the identified regions of the graphic, the one region corresponding to a selected tire, including:

(1) means for selecting the one identified region of the graphic, and (2) means for selecting one of a group of status fields within the display, the group consisting of a field representing return of the selected tire to inventory, a field representing disposition of the selected tire for retreading, and a field representing disposal of the selected tire; and means responsive to the inputting means for changing the corresponding one of the plurality of data in the database and for modifying the identified region of the graphic based on the selected tire and status field.

19. In a computer system having a display and including a user defined database management system or spread sheet which stores data, a method for managing a plurality of data which define attributes of vehicle tires, comprising the steps of:

defining an arbitrary, user defined graphic representing a vehicle that is displayed by the computer, the vehicle including each of the of the vehicle tires for which data are stored in the database or spread sheet;

identifying a plurality of regions of the graphic, each region representing a respective one of the vehicle tires;

linking each identified region of the graphic to a respective data field of at least one of the database management system and the spreadsheet corresponding to a respective one of the vehicle tires;

inputting a change to one of the data linked to a randomly selected one of the identified regions of the graphic, the one region corresponding to a selected tire, including the steps of:

(1) selecting the identified region of the graphic, and (2) selecting one of a group of status fields within the display, the group consisting of a field representing return of the selected tire to inventory, a field representing disposition of the selected tire for retreading, and a field representing disposal of the selected tire; and changing a corresponding value stored in the data field and modifying the identified region of the graphic based on the selected tire and status field.

20. A computer-readable medium for use in a computer system having a display and including a user defined database management system or spread sheet which stores data, said computer readable medium being encoded with a computer program for managing a plurality of data which define attributes of vehicle tires, the data including at least one of the group consisting of tire tread depth data and tire age data, the computer-readable medium comprising:

means for causing the computer to define and display a graphic representing the vehicle based on inputs from the user, the vehicle including each of the plurality of vehicle tires represented by the data;

means for causing the computer to identify a plurality of regions of the graphic, each region representing a respective one of the vehicle tires;

means for causing the computer to link each identified region of the graphic to a corresponding one of the plurality of data in the database representing vehicle tires;

input means for causing the computer to input a change to one of the data, the one datum being linked to a randomly selected one of the identified regions of the graphic, the one region corresponding to a selected tire, including:

(1) means for causing the computer to select the one identified region of the graphic, and (2) means for causing the computer to select one of a group of status fields within the display, the group consisting of a field representing a return of the selected tire to inventory, a field representing a disposition of the selected tire for retreading, and a field representing a disposal of the selected tire; and means, responsive to the input means, for causing the computer to change the corresponding one of the plurality of data in the database and modify the identified region of the graphic based on the selected tire and status field.

21. A system for measuring and processing tire tread depth data, comprising:

sensing means for measuring a tread depth of a tire and producing a tread depth signal representing the tire tread depth;

communications means coupled to the sensing means for receiving the tread depth signal and transmitting the tread depth signal to a computing means, means for automatically sensing an identifier of the tire, and transmitting the identifier with the tread depth signal, and said computing means including database means for i) receiving the tread depth signal and the identifier and ii) storing an entry associating the tire tread depth and the identifier with the tire.

* * * * *